(12) United States Patent
Gilliland et al.

(10) Patent No.: US 9,575,184 B2
(45) Date of Patent: Feb. 21, 2017

(54) LADAR SENSOR FOR A DENSE ENVIRONMENT

(71) Applicant: Advanced Scientific Concepts, Inc., Santa Barbara, CA (US)

(72) Inventors: Patrick Gilliland, Santa Barbara, CA (US); Howard Bailey, Santa Barbara, CA (US); Roger Stettner, Santa Barbara, CA (US); Nitin Kataria, Goleta, CA (US)

(73) Assignee: Continental Advanced LIDAR Solutions US, Inc., Carpinteria, CA (US)

( * ) Notice: Subject to any disclaimer, the term of this patent is extended or adjusted under 35 U.S.C. 154(b) by 250 days.

(21) Appl. No.: 14/323,353

(22) Filed: Jul. 3, 2014

(65) Prior Publication Data

US 2016/0003946 A1 Jan. 7, 2016

(51) Int. Cl.
*G01C 3/08* (2006.01)
*G01S 17/89* (2006.01)
(Continued)

(52) U.S. Cl.
CPC ............... *G01S 17/89* (2013.01); *G01S 7/484* (2013.01); *G01S 7/486* (2013.01); *G01S 7/4816* (2013.01);
(Continued)

(58) Field of Classification Search
CPC .......... G01S 17/10; G01S 17/87; G01S 17/89; G01S 17/936; G01S 17/4863; G01S 17/4816; G01S 17/484; G01S 17/486
(Continued)

(56) References Cited

U.S. PATENT DOCUMENTS

| 2007/0291130 | A1 | 12/2007 | Broggi et al. |
| 2014/0111812 | A1* | 4/2014 | Baeg ............... G01B 11/25 356/610 |
| 2015/0219764 | A1* | 8/2015 | Lipson ............... H01S 5/00 356/4.01 |

FOREIGN PATENT DOCUMENTS

| DE | 44 39 298 A1 | 6/1996 |
| EP | 0 312 788 A2 | 4/1989 |

OTHER PUBLICATIONS

Search Report for the counterpart Application EP 15174907.4
(Continued)

*Primary Examiner* — Mark Hellner

(57) ABSTRACT

A multi-ladar sensor system is proposed for operating in dense environments where many ladar sensors are transmitting and receiving burst mode light in the same space, as may be typical of an automotive application. The system makes use of several techniques to reduce mutual interference between independently operating ladar sensors. In one embodiment, the individual ladar sensors are each assigned a wavelength of operation, and an optical receive filter for blocking the light transmitted at other wavelengths, an example of wavelength division multiplexing (WDM). Each ladar sensor, or platform, may also be assigned a pulse width selected from a list, and may use a pulse width discriminator circuit to separate pulses of interest from the clutter of other transmitters. Higher level coding, involving pulse sequences and code sequence correlation, may be implemented in a system of code division multiplexing, CDM. A digital processor optimized to execute mathematical operations is described which has a hardware implemented floating point divider, allowing for real time processing of received ladar pulses, and sequences of pulses.

40 Claims, 15 Drawing Sheets

(51) Int. Cl.
  *G01S 17/10* (2006.01)
  *G01S 17/87* (2006.01)
  *G01S 17/93* (2006.01)
  *G01S 7/481* (2006.01)
  *G01S 7/484* (2006.01)
  *G01S 7/486* (2006.01)

(52) U.S. Cl.
  CPC .............. *G01S 7/4863* (2013.01); *G01S 17/10* (2013.01); *G01S 17/87* (2013.01); *G01S 17/936* (2013.01)

(58) Field of Classification Search
  USPC ....................................................... 356/5.01
  See application file for complete search history.

(56) References Cited

OTHER PUBLICATIONS

Thrun S et al, Stanley: The Robot that Won the DARPA Grand Challenge, Journal of Field Robotics, 2006, pp. 661-692, vol. 23, Issue 9. XP002691871.
DARPA, DARPA Grand Challenge 2005 Emergency Stop System Preliminary Guidance, Mar. 7, 2005, XP55224433.

* cited by examiner

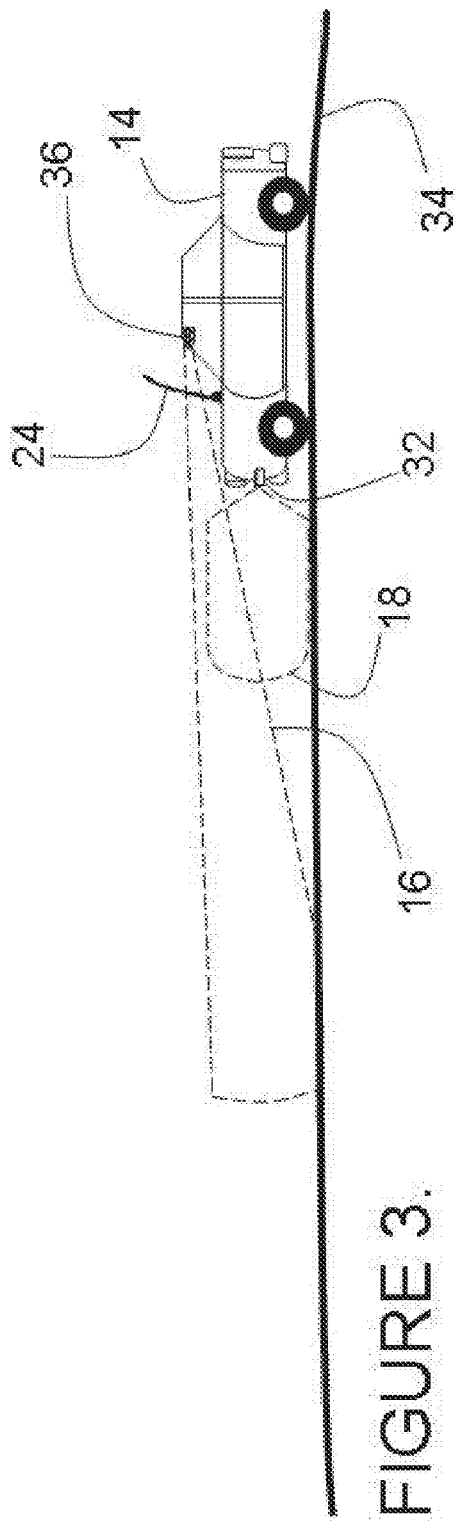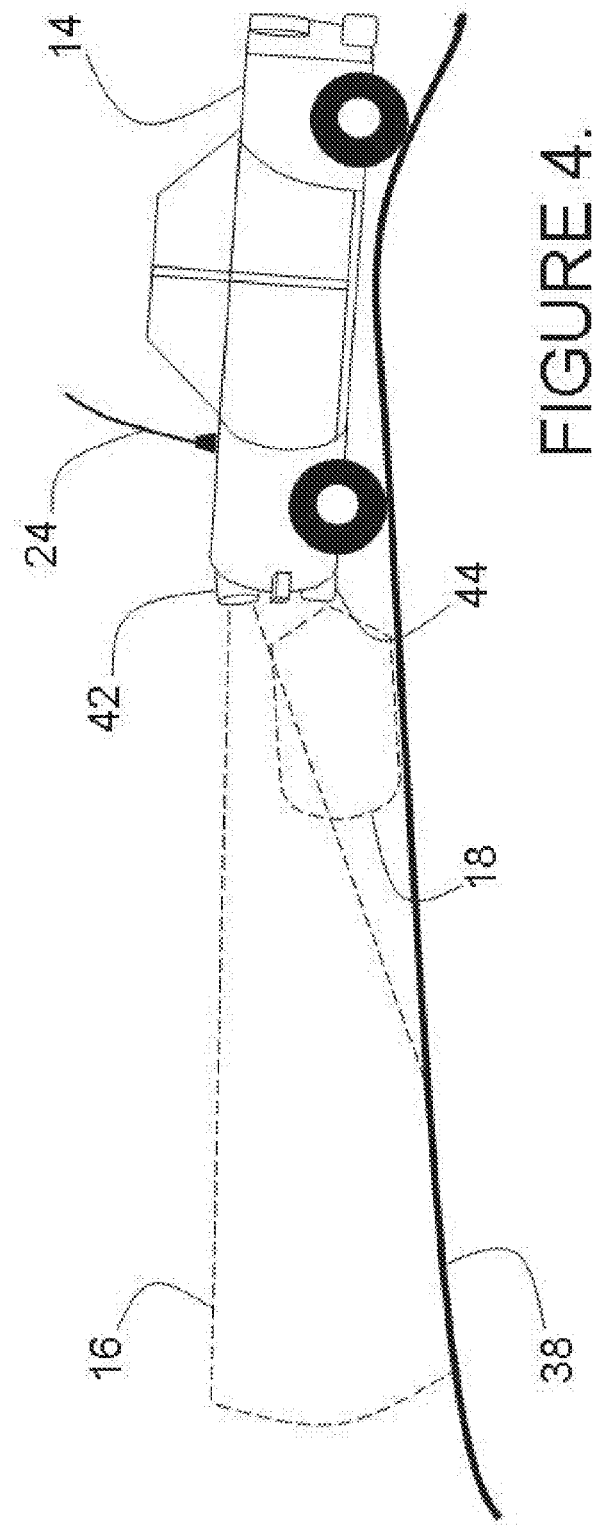

LADAR SENSOR FOR A DENSE ENVIRONMENT

BACKGROUND

Field of the Invention

The embodiments disclosed herein relate generally to 3-D image generation and the identification and tracking of objects, and more particularly to LADAR sensors for mobile applications such as road hazard avoidance, collision avoidance, and autonomous navigation. The invention compensates for the issues arising from the operation of a multiplicity of ladar sensors operating simultaneously in a common environment allowing for a great number of LADAR sensors to be operated independently, and in close proximity.

References to Related Art

The 3-D imaging technology disclosed in Stettner et al, U.S. Pat. Nos. 5,446,529, 6,133,989 and 6,414,746 provides with a single pulse of light, typically pulsed laser light, all the information of a conventional 2-D picture along with the third dimensional coordinates; it furnishes the 3-D coordinates of everything in its field of view. This use is typically referred to as flash 3-D imaging in analogy with ordinary digital 2-D cameras using flash attachments for a self contained source of light. As with ordinary 2-D digital cameras, the light is focused by a lens on the focal plane of the LADAR sensor, which contains an array of pixels called a focal plane array (FPA). In the case of a LADAR sensor these pixels are "smart" and can collect data which enables a processor to calculate the round-trip time of flight of the laser pulse to reflective features on the object of interest.

Many systems have been proposed to meet the challenge of using optical imaging and video cameras in a vehicle system to create 3-D maps of scenes and models of solid objects, and to use the 3-D database to navigate, steer, and avoid collisions with stationary or moving objects. Stereo systems, holographic capture systems, and those which acquire shape from motion, have not been able to demonstrate adequate performance in this application, but 3D LADAR based systems have shown the ability to rapidly capture 3-D images of objects and roadway features in the path of a moving vehicle, or travelling on an intersecting path, with sufficient speed and accuracy to allow the host vehicle to avoid collisions and road hazards, and steer the best path. In an environment where many such vehicles are operating on the same roadway, it is foreseeable there will be many light pulses from many LADAR sensors mounted on the vehicles operating in the common operating space. It is therefore highly probable there will be light pulses impinging on LADAR receivers which did not originate from the associated laser transmitter. These spurious light pulses from other LADAR sensors could cause serious confusion, and false range measurements, unless means are developed to eliminate or reduce this probability. A layered approach to reducing this form of interference is detailed, including the use of a number of discrete laser wavelengths and receiver optical filters to prevent spurious transmissions from entering the LADAR receiver optical detectors, an assignment of discrete laser pulse widths and a pulse width discriminator, and a system of pulse encoding and pulse decoding to separate out spurious pulses. It is anticipated there will be a great number of LADAR sensors manufactured and installed on automobiles, and some laser transmitter wavelengths may have to be reused, and some laser pulse widths may also have to be reused. Therefore, it is a remote, yet finite possibility there will be spurious laser pulses which have passed through the receiver optical filter and pulse width discriminator.

It is therefore desirable to provide a LADAR system capable of operating in a "dense" environment to avoid computations based on improper laser pulses.

SUMMARY OF THE INVENTION

A ladar system according to the present embodiments incorporates a first ladar sensor and a second ladar sensor. The first ladar sensor has a laser transmitter with a pulsed laser light output transmitting light at a first wavelength through a diffusing optic for illuminating a scene in a field of view of said first ladar sensor, a time zero reference circuit having a time zero reference output, said time zero reference output adapted to signal the beginning of the pulsed laser light transmission. The sensor additionally includes receiving optics for collecting and conditioning the pulsed laser light reflected from said scene in the field of view, a receive filter which receives light at said first wavelength and transmits light at said first wavelength and blocks light at a second wavelength, a two dimensional array of light sensitive detectors positioned at a focal plane of said receiving optics, and receiving light filtered through said receive filter at said first wavelength, and each of said light sensitive detectors with an output producing an electrical response signal from a reflected portion of said pulsed laser light output, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical response signal amplifier. A range measuring circuit is connected to the output of each of said electrical response signal amplifiers and further connected to the time zero reference output, and is adapted to produce a range measurement for each light sensitive detector based on the number of clock cycles occurring between the time zero reference output and the time of arrival of the electrical response signal. The second ladar sensor also has a laser transmitter with a pulsed laser light output transmitting light at a first wavelength through a diffusing optic for illuminating a scene in a field of view of said first ladar sensor, a time zero reference circuit having a time zero reference output, said time zero reference output adapted to signal the beginning of the pulsed laser light transmission. The sensor additionally includes receiving optics for collecting and conditioning the pulsed laser light reflected from said scene in the field of view, a receive filter which receives light at said first wavelength and transmits light at said first wavelength and blocks light at a second wavelength, a two dimensional array of light sensitive detectors positioned at a focal plane of said receiving optics, and receiving light filtered through said receive filter at said first wavelength, and each of said light sensitive detectors with an output producing an electrical response signal from a reflected portion of said pulsed laser light output, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical response signal amplifier. A range measuring circuit is connected to the output of each of said electrical response signal amplifiers and further connected to the time zero reference output, and is adapted to produce a range measurement for each light sensitive detector based on the number of clock cycles occurring between the time zero reference output and the time of arrival of the electrical response signal.

In alternative embodiments, each ladar sensor may alternatively include a pulse width discriminator adapted to receive electrical pulses from each unit cell, and to pass through valid electrical pulses of said first pulse width, and to block pulses of other pulse widths.

In other embodiments, each ladar sensor may alternatively include a code sequence correlator adapted to receive electrical signals from each unit cell, and to detect and validate said first coded sequence of electrical pulses, and to reject other electrical signals.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 3 is a side view of the second vehicle showing the passenger cabin and auxiliary lamp mounting options for the ladar sensors and the associated illuminating patterns;

FIG. 4 is a side view of the second vehicle showing the headlamp and front bumper mounting options for the LADAR sensors and the associated illuminating patterns;

DETAILED DESCRIPTION

Figure 1:
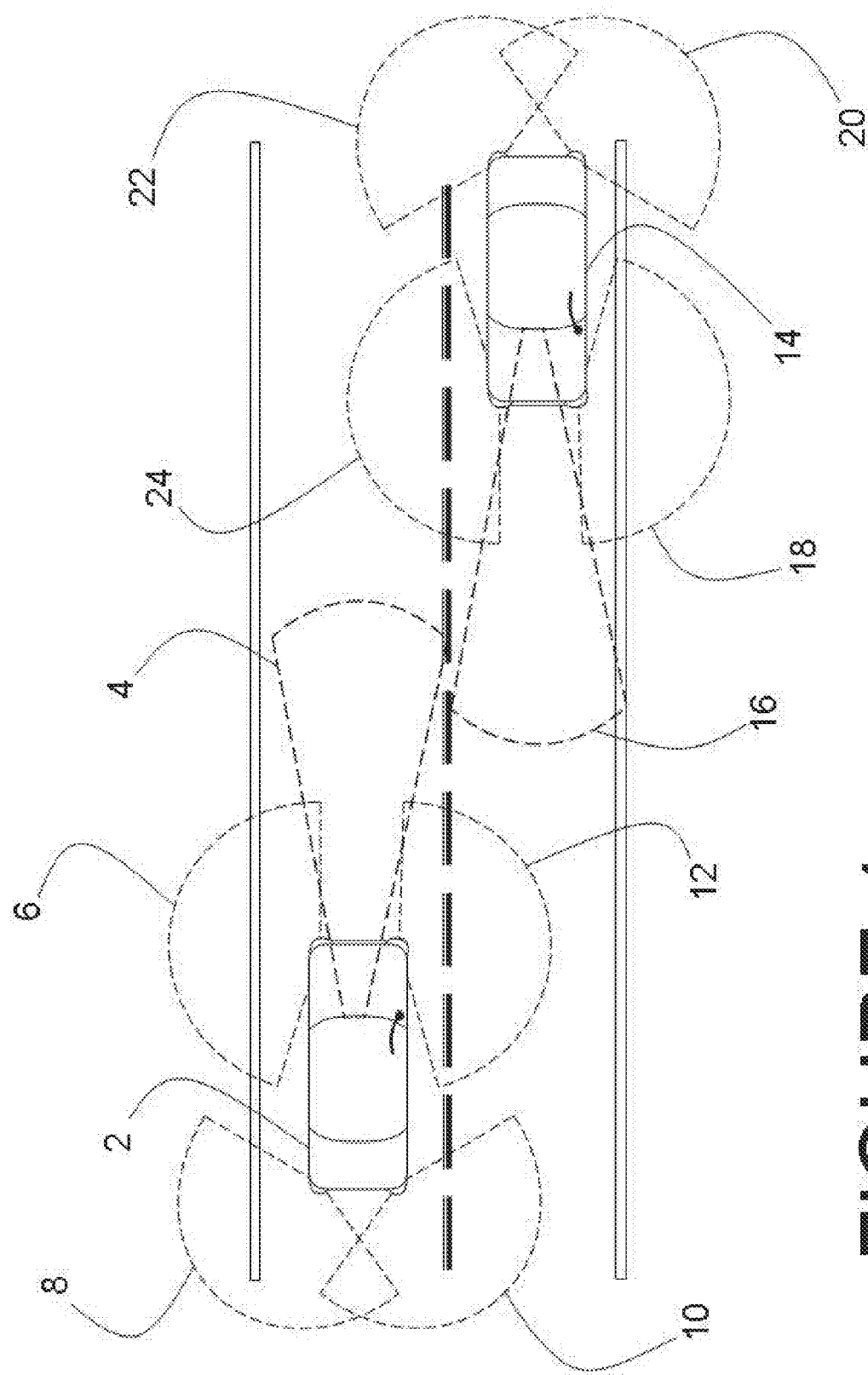
FIG. 1 is a diagram of a typical collision threat scenario with a first vehicle approaching a second vehicle from the left, in a head-on scenario.

This application contains new subject matter related to previous U.S. Pat. Nos. 5,696,577, 6,133,989, 5,629,524, 6,414,746, 6,362,482, D463,383, and U.S. patent application Ser. No. 10/066,340 filed on Jan. 31, 2002 and published as US 2002/0117340 A1, the disclosures of which are incorporated herein by reference.

The embodiments disclosed herein enable a system for collision avoidance, object and obstacle recognition and avoidance, and ride and steering control improvements. The benefits are realized through the use of a 3-D imaging facility, comprising a vehicle mounted ladar system with an object detection and recognition capability, a steering, braking, and accelerator control system, and a ride and suspension modification system. The system includes a number of provisions which assure the independent operability of a great number of ladar sensors having overlapping fields of view. These innovations include the assignment of a multiplicity of independent wavelengths to the individual ladar sensors, a pulse width discrimination scheme, and the digital encoding of a vehicle identification number (VIN) in the laser illuminating pulses allowing for a unique identifier in the illuminating pulse train to preclude the possibility of any spurious responses entering the digital processor tasked with navigating the host vehicle. These measures, taken together, reduce the probability of false object and range measurements due to interfering laser pulses from other ladar sensors within the common space. The vehicle mounted ladar system may comprise a number of side mounted, rear mounted, or forward looking ladar sensors connected to a central ladar system controller which synthesizes the available data from each of the independent ladar sensors into a composite 3D map of the immediate area in a full 360 degree arc surrounding the vehicle. In a preferred embodiment, conventional 2D still images or video sequences may be used to improve the quality of 3D solid models and scene maps.

Each vehicle may have a plurality of LADAR sensors, and each vehicle typically also has a digital processor, a wiring harness, and at least one connector receptacle is attached at a terminal end of the wiring harness. A mating connector plug is typically mounted to the assembly having the LADAR sensor, and is adapted to mate with the connector receptacle of the wiring harness. Alternatively, the plug may be mounted to the wiring harness, and the receptacle may be part of the LADAR sensor assembly. The multiple ladar sensors each have an illuminating laser module which may incorporate a semiconductor laser with a modulated laser light output, or a pulsed solid state laser, and a diffusing optic for illuminating a scene in the field of view of the long range, short range, or auxiliary ladar sensor. Each ladar sensor also comprises a receiver module featuring a two dimensional array of light sensitive detectors positioned at a focal plane of a light collecting and focusing assembly (Focal Plane Array). The ladar sensor may be incorporated into a headlight, taillight, or other auxiliary lamp assembly. The ladar sensor may also be part of a backup light, rearview mirror assembly, or mounted behind an opening in a bumper or grill assembly, or may be high mounted behind the windshield, on a roof support, or in a modular assembly mounted through a cutout in a body panel at the periphery of the vehicle or other vehicle position and may be enclosed within an envelope having at least one transparent section and also having at least one retention feature. Each ladar sensor may have a system control processor with frequency reference and inertial reference, a system memory, a pulsed laser transmitter, transmit optics, receive optics, an array of light detecting elements positioned at a focal plane of the receive optics, a detector bias converter for supplying bias voltage to the light detecting focal plane array, a readout integrated circuit, analog-to-digital converter circuits for producing digital image data from the analog readout IC outputs, a data reduction processor for adjusting and correcting the image data, and an object tracking processor for segregating, isolating, identifying, and tracking features and objects in the corrected image database. When paired with an intelligent vehicle system controller with vehicle, steering, braking, and suspension controls, substantial reductions in impact events, and less frequent and severe damage to the occupants and the vehicle is expected. The ladar sensor typically incorporates a hybrid assembly of focal plane array and readout integrated circuit, and the readout IC is arranged as an array of unit cell electrical circuits, and each unit cell is configured to fit in an array of identical spacing and order as the mating focal plane array. The ladar sensor in a preferred embodiment is capable of working in a flash mode as described above, or in a multi-pulse mode, or in a pulsed continuous-wave mode as the situation dictates. The collision avoidance and navigation system incorporating the ladar sensor has a number of features which enable full 3D object modeling and tracking, as well as scene enhancements derived from the merging of 2D and 3D data bases and managing of both 3D ladar sensors and conventional 2D video cameras.

Each of the light sensitive detectors of the FPA has an output producing an electrical response signal from a reflected portion of the laser light output. The electrical response signals are connected to a readout integrated circuit (ROIC) with a corresponding array of unit cell electrical circuits. Each of the unit cell electrical circuits has an input connected to one of the light sensitive detector outputs, an electrical response signal amplifier and a demodulator, and a range measuring circuit connected to an output of the electrical response signal demodulator. The demodulator may be a voltage sampler and analog shift register for storing sequential samples of the electrical response signals, or it may comprise a mixer, integrator, or matched filter. In the sampling mode, each unit cell uses a reference clock to time the samples being taken in response to the captured reflection of the laser light from a target surface. The demodulation may also take place external to the readout integrated circuit, by a fast digital processor operating on a sequence of digitized samples from each pixel. The fast digital processor may employ algorithms which utilize weighted sums of sequential analog samples, or use fast Fourier transforms, convolution, integration, differentiation, curve fitting, or other digital processes on the digitized analog samples of the electrical response. The fast digital processor may also employ algorithms which isolate or segment the roadway from other objects and objects from each other. Such objects may be automobiles, bicycles, motorcycles, trucks, persons, animals, walls, signs, road obstructions etc. These algorithms may compute position and orientation, as well as object velocity. Objects, their orientation, position and velocity may be transferred to a central computer for further processing and decision making. Each unit cell circuit has the ability to preserve the shape of the returned ladar pulse, and to make inferences about the shape of the surface within a pixel boundary as seen projected at a distance from the focal plane array, based on the shape of the reflected light pulse. The range measuring circuit is further connected to a reference signal providing a zero range reference for the modulated laser light output. The individual ladar sensor may also incorporate a detector bias circuit connected to a voltage distribution grid of the detector array and a temperature stabilized frequency reference.

FIG. 1 depicts an evolving scene which illustrates the benefits of the advanced features of the ladar sensors of the instant invention. In this diagram, a first vehicle 2 has a ladar sensor mounted behind the windshield with an illumination pattern 4, which is approaching a second vehicle 14 heading in the opposite direction in the adjacent lane. The forward radiation pattern 16 of a long range ladar sensor mounted behind the windshield is shown by dashed lines where it sweeps the roadway ahead of the second vehicle 14. Short range radiation pattern 6 is shown emanating from an auxiliary lamp assembly installed at the front left corner of first vehicle 2. A second short range radiation pattern 8 is shown emanating from an auxiliary lamp assembly installed at the left rear corner of first vehicle 2. A third short range radiation pattern 10 is shown emanating from an auxiliary lamp assembly installed at the right rear corner of first vehicle 2, and a fourth short range radiation pattern 12 is shown emanating from an auxiliary lamp assembly installed at the front right corner of first vehicle 2. On the approaching vehicle, short range radiation pattern 18 is shown emanating from an auxiliary lamp assembly installed at the front left corner of second vehicle 14. A second short range radiation pattern 20 is shown emanating from an auxiliary lamp assembly installed at the left rear corner of second vehicle 14. A third short range radiation pattern 22 is shown emanating from an auxiliary lamp assembly installed at the right rear corner of second vehicle 14, and a fourth short range radiation pattern 24 is shown emanating from an auxiliary lamp assembly installed at the front right corner of second vehicle 14. The numerous ladar sensors in this scenario provide object data and scene data to the central processing units aboard the respective vehicles. The central processors then act to avoid any potential collision, by sending commands to the vehicle control systems, in this particular case, mostly steering and speed control.

Figure 2:
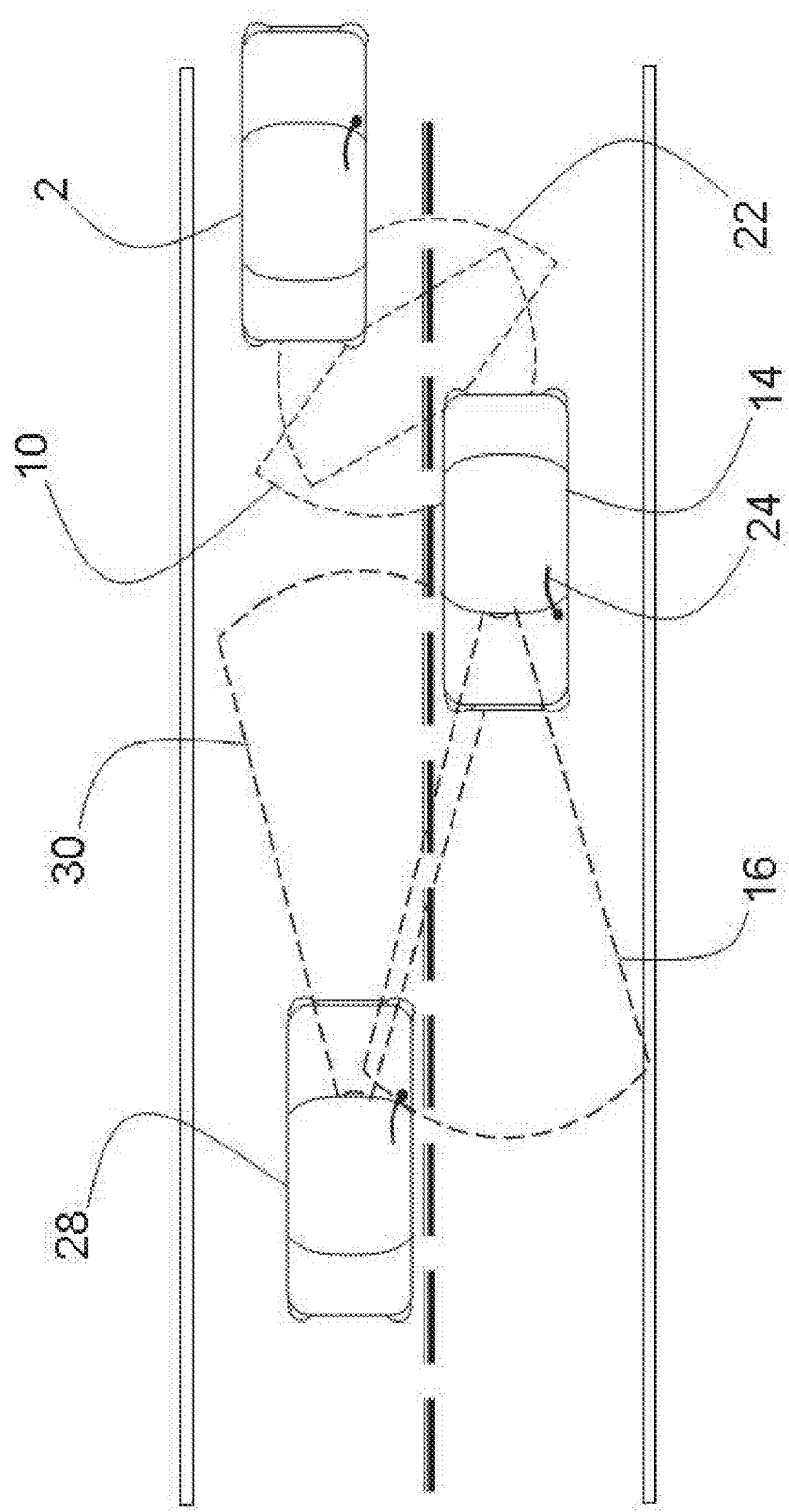
FIG. 2 shows the progression of the scenario depicted in FIG. 1, with the first vehicle now having passed the second vehicle on an opposite track, and now moving away. Meanwhile, a third vehicle has entered the scene at the left in the oncoming traffic lane, and is now on a head-on course toward the second vehicle.

FIG. 2 shows the evolution of the scene in FIG. 1. First vehicle 2 has now passed second vehicle 14. The illuminating pattern 10 of the ladar sensor embedded in the right rear taillamp assembly of first vehicle 2 is now illuminating the right rear quarter of second vehicle 14. Similarly, the illuminating pattern 22 of the ladar sensor embedded in the right rear taillamp assembly of second vehicle 14 is now illuminating the right rear quarter of first vehicle 2. This creates a situation where direct illumination from first vehicle 2 could be received at the same time as reflected light from the transmitter of second vehicle 14. A third vehicle 28 has now entered the scene at the left, on an opposite heading to second vehicle 14. Third vehicle 28 has a ladar sensor with a forward illuminating pattern 30 which is illuminating the right front side of second vehicle 14 as well as the receiver of the centrally mounted ladar sensor on second vehicle 14. Second vehicle 14 has a ladar sensor with a forward illuminating pattern 16 which is illuminating the right front side of third vehicle 28 as well as the receiver of the ladar sensor mounted within a headlamp assembly on third vehicle 28. This creates a situation where direct illumination from third vehicle 28 could be received at the same time as reflected light from the transmitter of second vehicle 2. A timing diagram illustrating this condition can be seen in FIG. 9. Antenna 24 on second vehicle 14 receives positional reference data, road conditions updates and weather information from a central road conditions database, and may also communicate directly with first vehicle 2, and third vehicle 28, to cooperatively manage the situation.

FIG. 3 shows an individual pose in profile of second vehicle 14 on a roadway 34 having a ladar sensor 36 mounted in a high position behind the windshield. The illumination pattern 16 is shown just clearing the front edge of the hood of vehicle 14. A short range ladar sensor is embedded in corner mounted signal light 32, having a short range illumination pattern 18. The vehicle 14 also has an antenna 24 with a duplex radio link connected for downloading road conditions and positional reference data, and uploading local road conditions to a central road conditions database or communicating directly with other vehicles.

FIG. 4 shows a close up individual pose in profile of second vehicle 14 on a roadway 38 having a ladar sensor 42 mounted in a headlamp assembly at the front of vehicle 14. The illumination pattern 16 is now shown intersecting the roadway 38 at a point closer to the front of vehicle 14. Additionally, the field of view may be swept laterally and vertically depending on the situation of the vehicle and the roadway 38. In this case, as the vehicle 14 crests the top of a small hill, the ladar sensor embedded in the headlamp assembly is steered to a greater angle of depression, allowing the profiling of the roadway 38 to continue uninterrupted. A short range ladar sensor is embedded in the front bumper 44, producing the short range illumination pattern 18. The vehicle 14 also has an antenna 24 with a duplex radio link connected for downloading road conditions and positional reference data, and uploading local road conditions to a central road conditions database.

Figure 5:
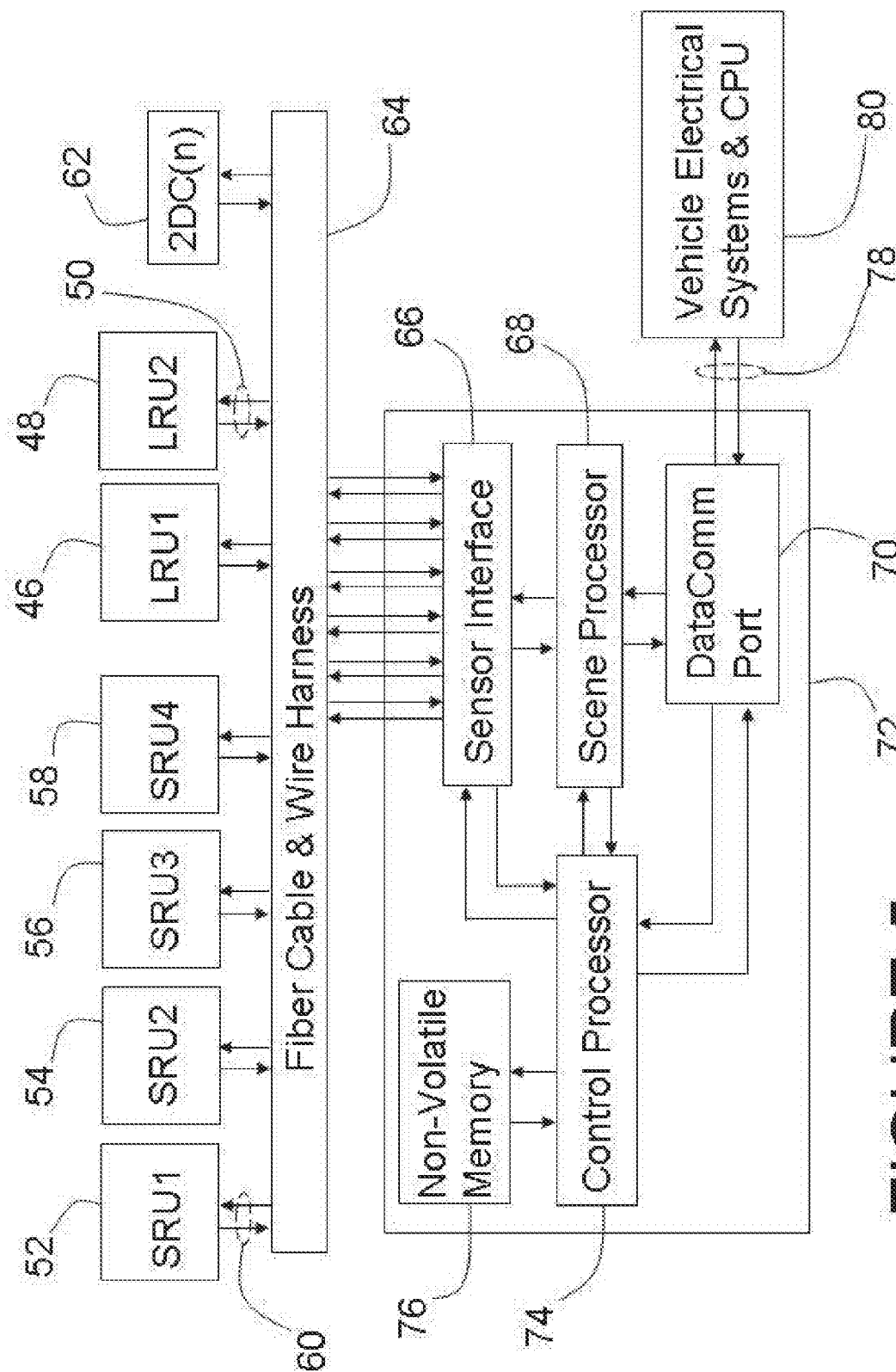
FIG. 5 is a block diagram of a typical vehicle installation, showing a number of short range LADAR sensors, long range LADAR sensors, 2D video cameras, the LADAR system controller, the interconnecting fiber cable and wiring harness, and the connections to the host vehicle electrical systems and computers.

FIG. 5 is a block diagram showing details of a ladar system controller 72 and the interconnections with the cooperating systems of a host vehicle 2. The ladar system controller 72 is an intermediate function which integrates all of the 3D data captured by the various ladar sensors installed on the host vehicle while monitoring the status of these sensors, and providing control inputs thereto. The ladar system controller 72 may be subsumed as a piece of software or hardware into the vehicle CPU in some vehicle designs. The ladar system controller 72 comprises a sensor interface 66, which transmits commands to the short range ladar sensors SRU1 52, SRU2 54, SRU3 56, and SRU4 58, and to the long range ladar sensors LRU1 46 and LRU2 48. A fiber cable and wire harness 64 provides the physical media for the transfer of the commands from the sensor interface 66 to the various ladar sensors. 3D data and status signals are returned from the various ladar sensors to sensor interface 66 through fiber cable and wire harness 64. Likewise, command signals are sent to a number (n) of 2D cameras 62, and status and image data are returned from the 2D cameras via wire harness 64 to ladar system controller 72. Each of the long range sensor units 46, 48, connect through a set of bidirectional connections 50 which logically include the transmitters and receivers within each long range sensor unit 46, 48, the physical media of fiber cable and wire harness 64 and the transmitters and receivers of sensor interface 66. Each short range sensor unit 52-58 connects through a set of bidirectional connections 60 which logically include the transmitters and receivers within each short range sensor unit, the physical media of fiber cable and wire harness 64, and the transmitters and receivers of sensor interface 66. Sensor interface 66 receives digital logic levels from scene processor 68 and control processor 74 and conditions these signals for transmission over fiber cable and wire harness 64 to the various ladar sensors installed on the host vehicle 2. Sensor interface 66 may provide amplification, level adjustment, digital-to-analog conversion, and electrical-to-optical signal conversion for outbound signals from control processor 74 and scene processor 68 intended for one or more of the various ladar sensors or 2D cameras installed on the vehicle 2. Conversely, for inbound signals, sensor interface 66 may provide amplification, level shifting, analog-to-digital conversion, and optical-to-electrical conversion for 3D or 2D data and status signals sent from any one of the various ladar sensors or 2D cameras installed on the vehicle 2 and then provides these received and/or converted signals to control processor 74 and scene processor 68 as digital signals. The sensor interface 66, including D/A and A/D signal converters, may reside completely or in part on a readout integrated circuit (118 in FIG. 8). Scene processor 68 combines the 3D frames received from each of the operational ladar sensors into a composite 3D map of the entire space directly in front of and surrounding the vehicle 2 and may also merge the 3D map with 2D image data received from a number (n) of 2D still or video cameras 62 to provide enhanced resolution, color, and contrast. The addition of conventional 2D still or video cameras 62 provide the system with enhanced capability for object identification. Complete 3D maps of the area surrounding the vehicle 2 are best enabled when the auxiliary, short range sensors 52-58 are installed. In a preferred embodiment, the six ladar sensors comprised of 2 long range sensors 46, 48 and 4 short range sensors 52-58 provide a full 360° field of view, and a 3D map may be synthesized by scene processor 68 for the entire space surrounding and in front of vehicle 2. Some vehicle installations also include rear facing long range ladar sensors (not shown) to provide an additional margin of safety. Overlapping fields of view between long range sensors may allow scene processor 68 to eliminate some shadows in the far field pattern, or to gain additional shape data which may allow positive identification of an object or obstacle in the path of the vehicle 2. Overlapping fields of view between short range and long range sensors give scene processor 68 additional shape information on any feature or object in the combined field of view, as well as a reduction of shadows, owing to the wider angles swept out by the short range sensors 52-58. Control processor 74 receives status data from the ladar sensors indicating laser temperature, transmitted laser pulse power and pulse shape, receiver temperature, background light levels, etc. and makes decisions about adjustments of global input parameters to the various ladar sensors being controlled. Global settings for detector bias, trigger sensitivity, trigger mode or SULAR (Staring Underwater Laser Radar) mode, filter bandwidth, etc. may be sent from control processor 74 to a given ladar sensor which may override the local settings originally set or adjusted by a local control processor residing within a particular ladar sensor. SULAR mode and trigger mode operations are described in detail with respect to FIG. 8. A non-volatile memory 76 provides a storage location for the programs which run on control processor 74 and scene processor 68, and may be used to store status data and other data useful at start-up of the system. A data communications port 70 typically comprises an Ethernet port or Gigabit Ethernet port, but may be a USB, IEEE 1394, Infiniband, or other general purpose data port, and is connected so as to provide bidirectional communications between the control processor 70 or the scene processor 68 and the vehicle electrical systems and central processors 80 through connections 78. Connections 78 may be optical, electrical, or a combination of both, and include any transmitters and receivers necessary to condition and transmit the data signals in both directions. Data communications port 70 may also be a special purpose communications port specific to a vehicle manufacturer. The 3D range data derived from the reflections of the modulated laser light allows for an initial object model to be determined, and for some object identification to take place in a processor of the individual ladar sensors installed on vehicle 2. Refinements of the object model may be made at higher levels in the system where data from the several sensors may be integrated with the data from previous frames. This capability of looking at historical data as well as current data, allows for some road hazards and collision threats to be viewed from a plurality of angles as the vehicle 2 travels forward, thus eliminating some shadows, while additional shape information is developed from the multiple angles of observation. Having this additional object data may allow scene processor 68 to refine the object models stored in memory 76. A more precise object model may allow scene processor 68 or vehicle CPU 80 to make better progress in identifying the various objects and features which may pose a collision threat to vehicle 2.

Figure 6:
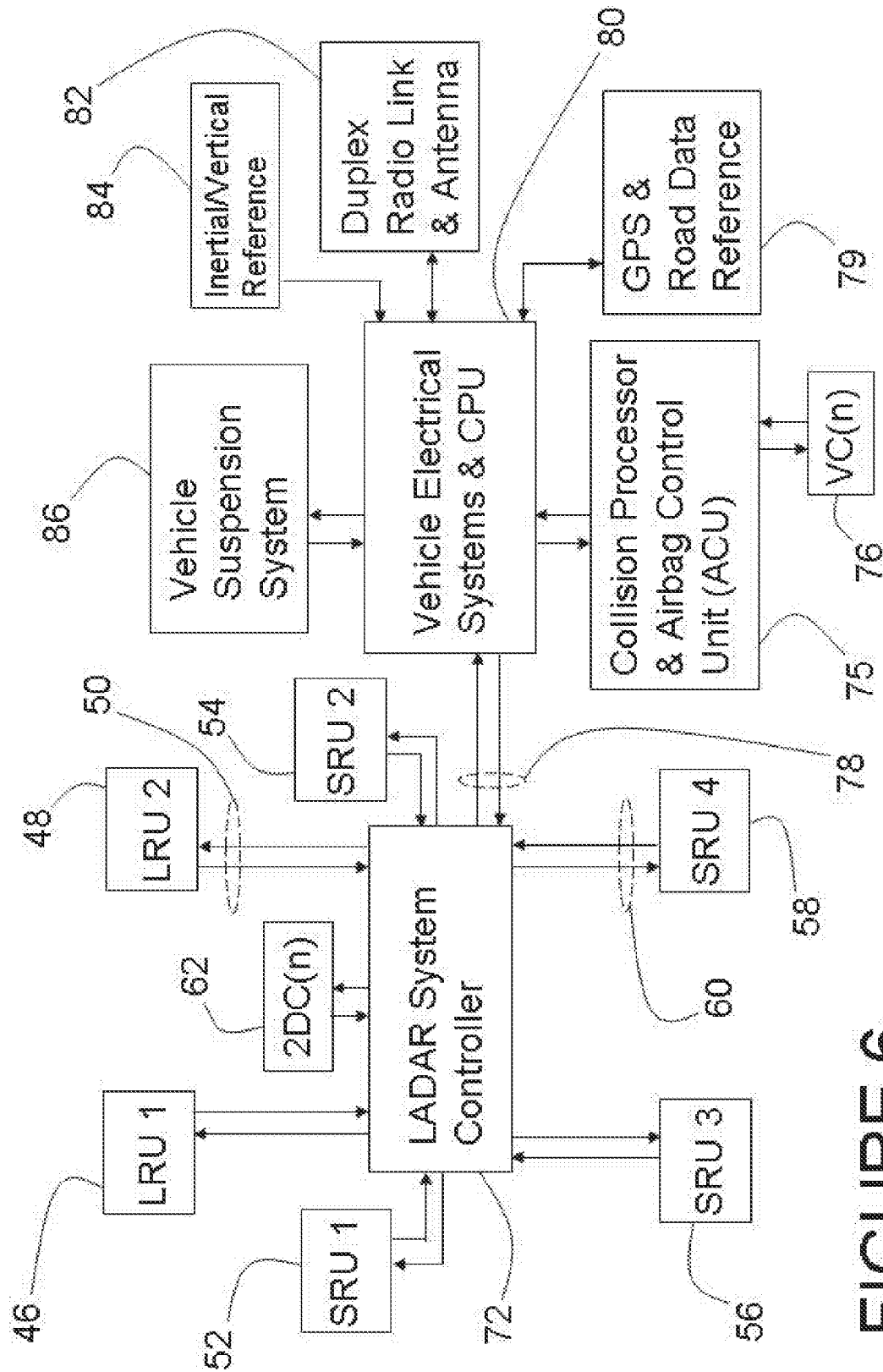
FIG. 6 is a block diagram shows the elements of a typical vehicle installation, and expanding the vehicle electrical systems and CPU into the component subsystems which regulate the vehicle suspension, provide an inertial navigation reference, provide global positioning references, make decisions to deploy airbags, and communicate via duplex radio link to the outside world.

FIG. 6 is a system block diagram showing the relationship and connections of the major functional blocks of the vehicle electrical systems and central processing unit (CPU) with the ladar sensor system. A ladar system controller 72 communicates with all of the ladar sensors mounted on the vehicle. In a typical installation, two long range units, LRU 1 46 and LRU 2 48 connect to ladar system controller 72 through a set of bidirectional electrical connections 50. The electrical connections may also have an optical waveguide and optical transmitters and receivers to transfer data, control, and status signals bidirectionally between long range ladar sensors 46, 48 and ladar system controller 72. Ladar system controller 72 also communicates with the 4 short range units, SRU 1 52, SRU 2 54, SRU3 56, and SRU4 58, each through a set of bidirectional electrical connections 60. The electrical connections may also have an optical waveguide and optical transmitters and receivers to transfer data, control, and status signals bidirectionally between short range ladar sensors 52-58 and ladar system controller 72. Each of the ladar sensors may include data processors to reduce the processing load on the scene processor (68 in FIG. 5), the vehicle CPU 80, and the collision processor 74; for example, developing the point cloud and isolating/segmenting objects in the field of view and object speed from the point cloud. Conventional 2D visible light or infrared viewing cameras 62 may be embedded within the ladar sensor subsystem, and may be part of a sub-assembly containing a ladar sensor. These cameras 62 may share the same connections 50 or 60 to the ladar system controller 72. A number (n) of other visible light 2D still or video cameras 76 may connect directly to the vehicle collision processor 75 and produce scene data complementary to the 3D data generated by the various ladar sensors mounted to the vehicle. The 2D still or video cameras 76 may also operate at either visible or infrared wavelengths. The fields of view of the 2D still or video cameras 76 are designed to overlap the fields of view of the ladar sensors (46, 48, and 52-58) installed on the vehicle 2. Bidirectional electrical connections 78 also serve to transfer 3D data maps, status, and control signals between ladar system controller 72 and the vehicle electrical systems and central processing unit (CPU) 80. At the core of the vehicle, an electronic brain may control all functioning of the vehicle 2, and typically controls all other subsystems and co-processors. The electronic brain, or central processing unit (CPU 80) is here lumped together with the basic electrical systems of the vehicle, including battery, headlights, wiring harness, etc. The vehicle suspension system 86 receives control commands and returns status through bidirectional electrical connections, and is capable of modifying the ride height, spring rate, and damping rate of each of the vehicle wheels independently. An inertial reference 84 also has a vertical reference, or gravity sensor as an input to the CPU 80. A global positioning reference 79 may also be connected to the vehicle CPU 80. The GPS reference 79 may also have a database of all available roads and conditions in the area which may be updated periodically through a wireless link. A duplex radio link 82 may also be connected to CPU 80, and may communicate directly with other vehicles 14, 28 in close range, sharing position, speed, direction, and vehicle specific information to facilitate collision avoidance and the free flow of traffic. The duplex radio link may also receive local positional references, road data, weather conditions, and other information important to the operations of the vehicle 2 from a central road conditions database through roadside antennas or cellular stations. The vehicle 2 may also provide vehicle status and road conditions updates to the central road conditions database via radio uplink 82, allowing the central road conditions database to be augmented by any and all vehicles which are equipped with ladar sensors and a radio link 82. A collision processor and airbag control unit 75 connects bidirectionally to CPU 80 as well, receiving inputs from a number of accelerometers, brake sensors, wheel rotational sensors, ladar sensors, etc. ACU 75 makes decisions on the timing and deployment of airbags and other restraints. Though the system of FIG. 6 is shown with the vehicle on which the system is nominally installed, and which is typically an automobile, the system, and any of the described components and subsystems are designed to be installed on any number of moving vehicles which may be actively piloted, semi-autonomously navigated, or fully autonomously steered and controlled, and which may be manned or unmanned, including planes, trains, automobiles, motorcycles, helicopters, boats, ships, robotic crawlers, spacecraft, hovercraft, airships, jeeps, trucks, robotic crawlers, gliders, utility vehicles, street sweepers, submersibles, amphibious vehicles, and sleds.

Figure 7:
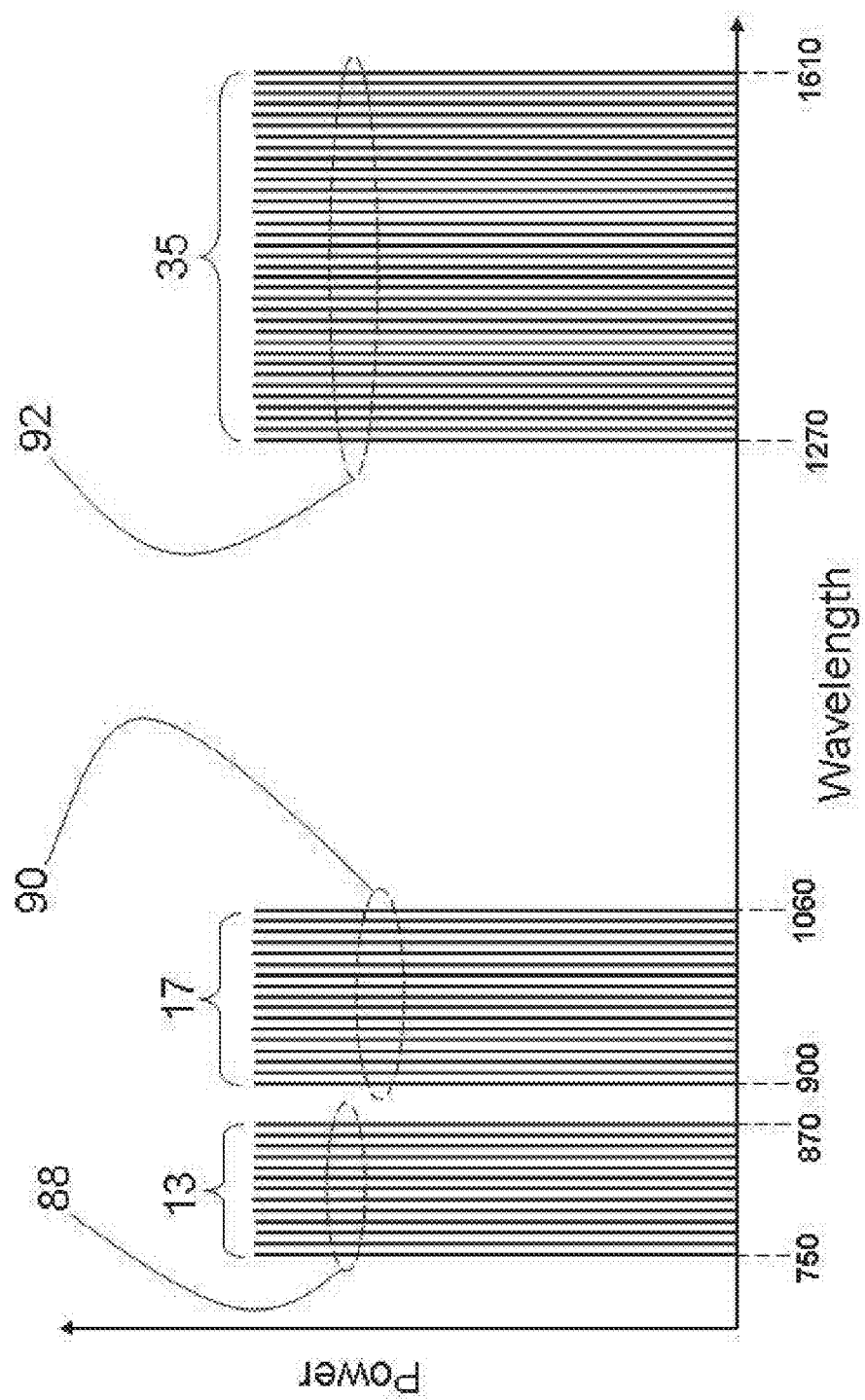
FIG. 7 is a diagram showing three common wavelength bands of semiconductor lasers which may be fully populated with laser transmitters in order to reduce the potential for LADAR-to-LADAR interference. The wavelength versus power chart spaces a number of semiconductor laser sources at approximately 10 nm intervals in three popular bands.

FIG. 7 shows a chart of available laser diode wavelengths which may be utilized in the wavelength diverse LADAR system for dense environments. The first wavelength band 88 of 750-870 nm corresponds to the high volume and low cost AlGaAs laser diode material system. This material system covers many popular applications including optical disc drives, fiber optic LAN communications, and near-R surveillance cameras. Shown are 13 wavelengths spaced at 10 nm apart to allow for inexpensive receive and transmit optical filters. The wavelength range 750-870 nm corresponds to an aluminum percentage varying from about 20% at 750 nm to 0% at 870 nm. The second wavelength band 90 covers 900-1060 nm in 10 nm increments which is typically formed in InGaAs, and used in 976 nm pump lasers for Erbium Doped Fiber Amplifiers (EDFAs), and for laser rangefinders, and night vision/thermal sensing applications. There are 17 discrete wavelengths identified here on 10 nm pitch, which are variants of commonly available laser diodes. The gap between the upper end of the first band 88 at 870 nm and the lower end of the second band 90 at 900 nm is not a result of any fundamental physics problem, but rather the lack of any compelling application to drive the production at these wavelengths, and indeed these lasers do exist, but are not common. The same holds true for the gap between the upper end of the second band 90 at 1060 nm and the lower end of the third band 92 at 1270. Laser diodes in this range are not commonly available, again due to a lack of a compelling application requiring a laser diode in this range. The third wavelength range 92, from 1270-1610 corresponds to the InGaAs material system as well, but the 1270-1330 nm range is very useful for Metro/WAN fiber communications, and the 1530-1610 nm wavelength for long distance ITU telecomm fiber applications. The availability of lasers at these wavelengths means they will be the first, and most easily adapted to the automotive LADAR sensing applications described herein.

Shown in this third band 92, are 35 discrete wavelengths at 10 nm spacing. Together with the first band 88 and second band 90, 65 wavelengths are available which may be used independently and orthogonally given a low cost 10 nm optical bandpass filter. Many other wavelengths can be developed; there is only the need for a volume application such as automotive LADAR sensing, and/or robotic driving for autonomously piloted vehicles. The entire wavelength range from 750-2200 nm is available for laser diodes in a variety of material combinations, though some wavelengths may be harder to realize than some others. Some wavelengths may require additional work to develop growth techniques and laser structures which yield acceptable power levels and efficiencies. Also, the first band 88 between 750 and 870 nm might be somewhat less desirable because it is inherently more dangerous to the human eye than the longer wavelengths in the second bands 90 and third band 92. This fact may constrain the shortest wavelength lasers in the first band 88 to be operated at the very lowest power densities, and therefore only suitable for those ladar sensors designed into short range applications. As a general rule, more power can be safely radiated with increasing wavelength. It is therefore reasonable to expect we could have 145 independent laser diode transmitting wavelengths spaced at 10 nm intervals between 750-2200 nm, given the appropriate market demand and responsive investment.

Figure 8:
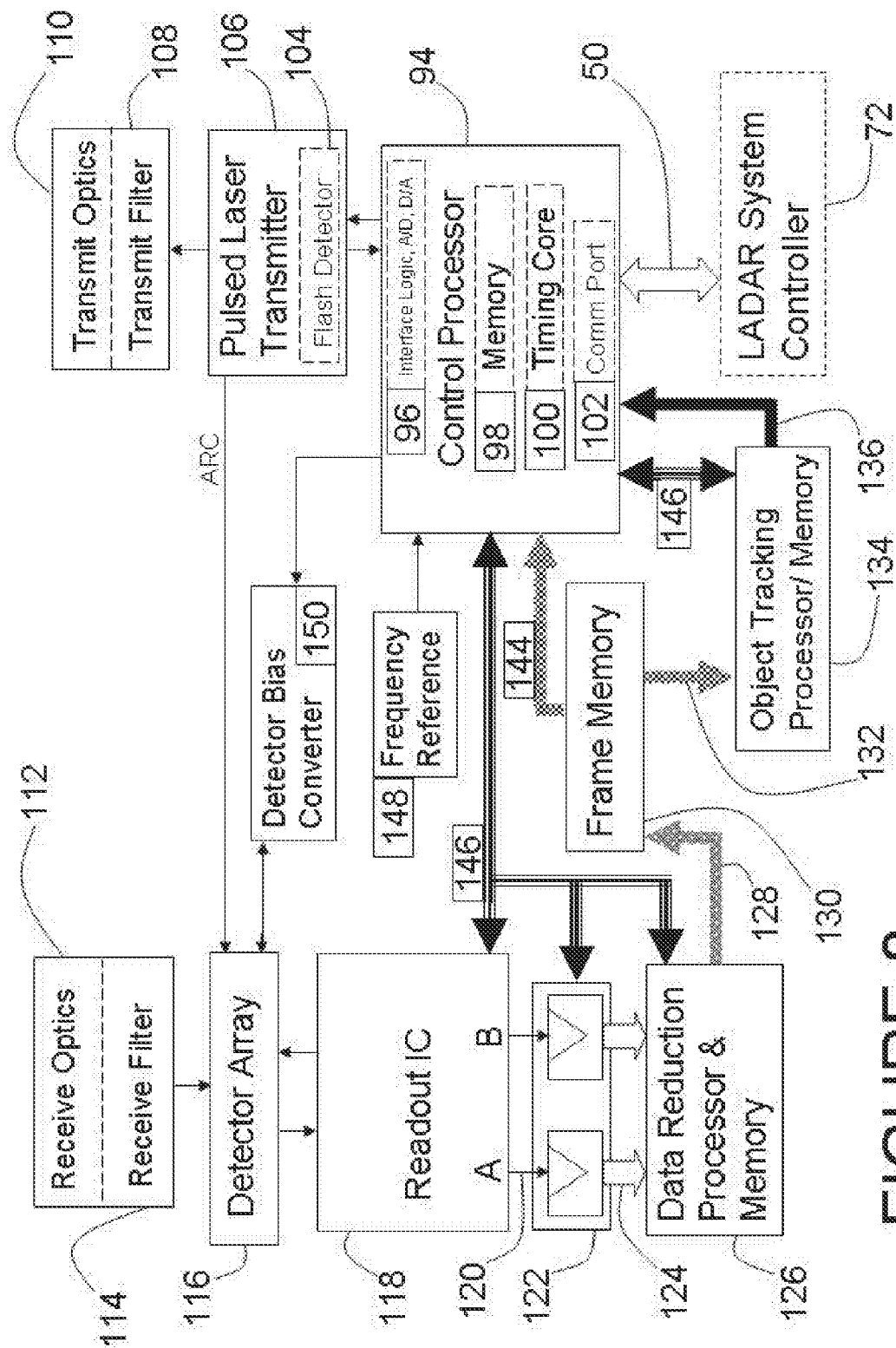
FIG. 8 is a system block diagram of a LADAR system of the type suitable for use in the dense LADAR environment which results from the installation of multiple LADAR sensors on a substantial majority of the automobiles travelling the highway, including the unit control processor and subsystems for creating laser illuminating pulses, receiving the reflected laser pulses, reducing the data, storing the images, and identifying objects within the image data sets.

FIG. 8 is a block diagram of a ladar sensor which describes both long range ladar sensors 46, 48 and short range sensors 52-58 typical of the preferred embodiment. Adaptations of the pulsed laser transmitter 106, transmit optics 110, receive optics 112, and in some cases, programmable changes to the sampling circuitry of readout integrated circuit 118 may be effected to provide range enhancement, wider or narrower field of view, and reduced size and cost. The first embodiment provides a 128×128 or 128×64 detector array 116 of light detecting elements situated on a single insulating sapphire substrate which is stacked atop a readout integrated circuit 118 using a hybrid assembly method. In other embodiments of the design, M×N focal plane arrays of light detecting elements with M and N having values from 2 to 1024 and greater are anticipated. The functional elements depicted in FIG. 8 may first be described with respect to the elements of a typical long range ladar sensor 46. A control processor 94 controls the functions of the major components of the ladar sensor 46. Control processor 94 connects to pulsed laser transmitter 106 through bidirectional electrical connections (with interface logic, analog to digital (A/D) and digital to analog (D/A) converters 96) which transfer commands from control processor 94 to pulsed laser transmitter 106 and return monitoring signals from pulsed laser transmitter 106 to the control processor 94. The interface logic, including analog to digital (A/D) and digital to analog (D/A) converters 96, may reside completely or in part on the readout integrated circuit. A light sensitive diode detector (Flash Detector) 104 is placed at the back facet of the laser so as to intercept a portion of the laser light pulse produced by the pulsed laser transmitter 106. An optical sample of the outbound laser pulse taken from the front facet of pulsed laser transmitter 106 is routed to a corner of the detector array 116 as an automatic range correction (ARC) signal, typically over a fiber optic cable. The pulsed laser transmitter 106 may be a solid-state laser, monoblock laser, semiconductor laser, fiber laser, or an array of semiconductor lasers. It may also employ more than one individual laser to increase the data rate. In a preferred embodiment, pulsed laser transmitter 106 is an array of vertical cavity surface emitting lasers (VCSELs). In an alternative embodiment, pulsed laser transmitter 106 is a disc shaped solid state laser of erbium doped phosphate glass pumped by 976 nanometer semiconductor laser light.

In operation, the control processor 94 initiates a laser illuminating pulse by sending a logic command or modulation signal to pulsed laser transmitter 106, which responds by transmitting an intense burst of laser light through transmit filter 108 and transmit optics 110. In the case of a Q-switched solid state laser based on erbium glass, neodymium-YAG, or other solid-state gain medium, a simple bi-level logic command may start the pump laser diodes emitting into the gain medium for a period of time which will eventually result in a single flash of the pulsed laser transmitter 106. In the case of a semiconductor laser which is electrically pumped, and may be modulated instantaneously by modulation of the current signal injected into the laser diode, a modulation signal of a more general nature is possible, and may be used with major beneficial effect. The modulation signal may be a flat-topped square or trapezoidal pulse, or a Gaussian pulse, or a sequence of pulses. The modulation signal may also be a sinewave, gated or pulsed sinewave, chirped sinewave, or a frequency modulated sinewave, or an amplitude modulated sinewave, or a pulse width modulated series of pulses. The modulation signal is typically stored in on-chip memory 98 as a lookup table of digital memory words representative of analog values, which lookup table is read out in sequence by control processor 94 and converted to analog values by an onboard digital-to-analog (D/A) converter 96, and passed to the pulsed laser transmitter 106 driver circuit. The combination of a lookup table stored in memory 98 and a D/A converter, along with the necessary logic circuits, clocks, and timers 100 resident on control processor 94, together comprise an arbitrary waveform generator (AWG) circuit block. The AWG circuit block may alternatively be embedded within a laser driver as a part of pulsed laser transmitter 106. Transmit optics 110 diffuse the high intensity spot produced by pulsed laser transmitter 106 substantially uniformly over the desired field of view to be imaged by the ladar sensor 46. Transmit filter 108 acts to constrain the laser light output to the design wavelength, removing any spurious emissions outside the design wavelength of the pulsed laser transmitter 106. An optical sample of the transmitted laser pulse (termed an ARC signal) is also sent to the detector array 116 via optical fiber. A few pixels in a corner of detector array 116 are illuminated with the ARC (Automatic Range Correction) signal, which establishes a zero time reference for the timing circuits in the readout integrated circuit (ROIC) 118. Each unit cell of the readout integrated circuit 118 has an associated timing circuit which is started counting by an electrical pulse derived from the ARC signal. Alternatively, the flash detector 104 signal may be used as a zero reference in a second timing mode. Though the ARC signal neatly removes some of the variable delays associated with transit time through the detector array 116, additional cost and complexity is the result. Given digital representations of the image frames, the same task may be handled in software/firmware by a capable embedded processor such as data reduction processor 126. When some portion of the transmitted laser pulse is reflected from a feature in the scene in the field of view of the ladar sensor 46, it may be incident upon receive optics 112, typically comprising the lens of a headlamp assembly and an array of microlenses atop detector array 116. Alternative embodiments use enhanced detectors which may not require the use of microlenses. Other alternative embodiments of receive optics 112 employ diffractive arrays to collect and channel the incoming light to the detector array 116 individual elements. Pulsed laser light reflected from a feature in the scene in the field of view of receive optics 112 is collected filtered through receive filter 114, and focused onto an individual detector element of the detector array 116. This reflected laser light optical signal is then detected by the affected detector element and converted into an electrical current pulse which is then amplified by an associated unit cell electrical circuit of the readout integrated circuit 118, and the time of flight measured. Thus, the range to each reflective feature in the scene in the field of view is measurable by the ladar sensor 46. The detector array 116 and readout integrated circuit 118 may be an M×N or N×M sized array. Transmit optics 110 consisting of a spherical lens, cylindrical lens, holographic diffuser, diffractive grating array, or microlens array, condition the output beam of the pulsed laser transmitter 106 into a proper conical, elliptical, or rectangular shaped beam for illuminating a central section of a scene or objects in the path of vehicle 2, as illustrated in FIG. 1.

Figure 17:
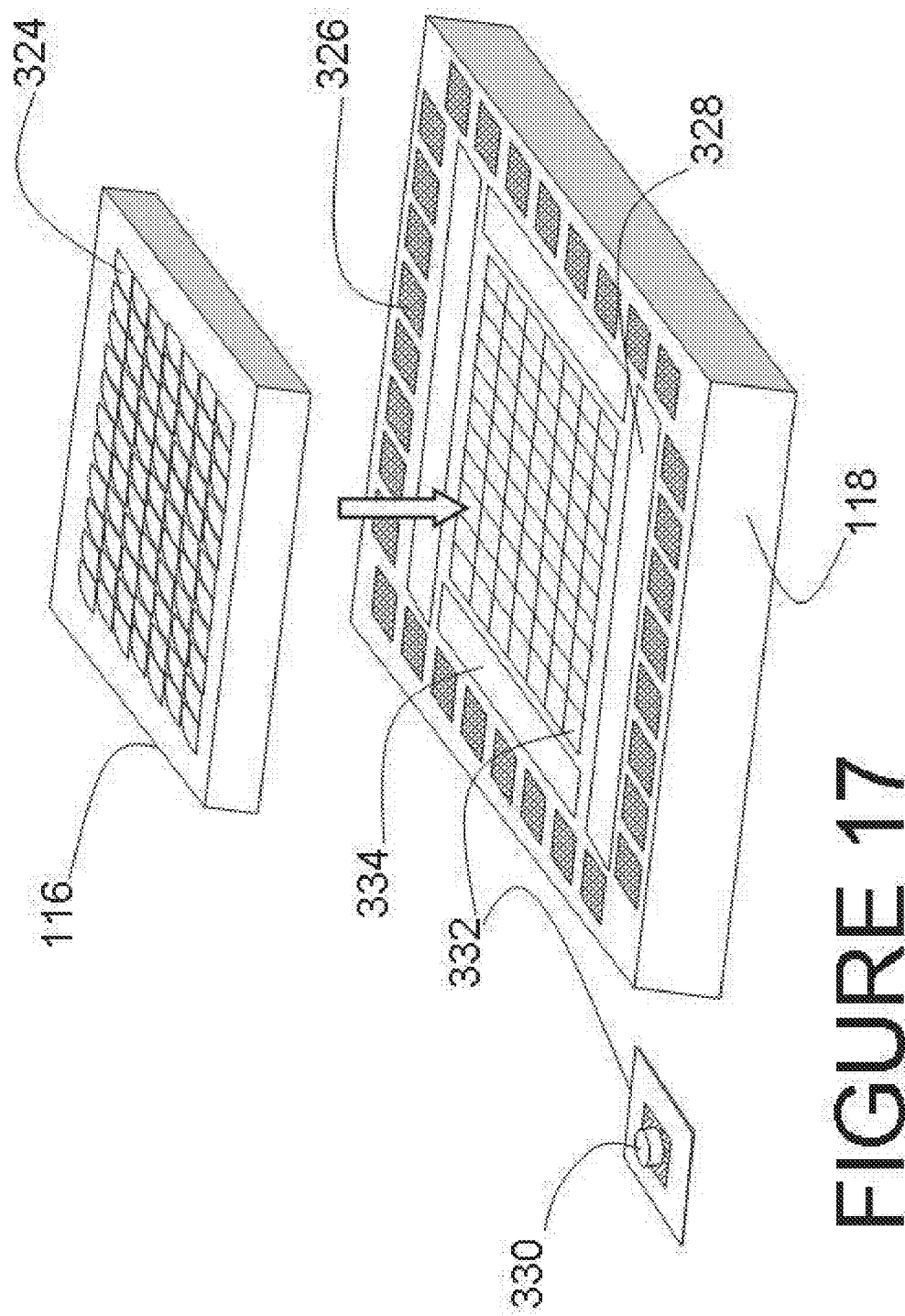
FIG. 17 is an isometric view of the hybrid assembly of the detector array and readout integrated circuit described herein.

Continuing with FIG. 8, receive optics 112 may be a convex lens, spherical lens, cylindrical lens or diffractive grating array. Receive optics 112 collect the light reflected from the scene and focus the collected light on the detector array 116. Receive filter 114 restricts the incoming light to the proper wavelength band associated with the transmitter of the same ladar sensor 46. In a preferred embodiment, detector array 116 is formed in a thin film of gallium arsenide deposited epitaxially atop an indium phosphide semiconducting substrate. Typically, detector array 116 would have a set of cathode contacts exposed to the light and a set of anode contacts electrically connected to the supporting readout integrated circuit 118 through a number of indium bumps deposited on the detector array 116. The cathode contacts of the individual detectors of detector array 116 would then be connected to a high voltage detector bias grid on the illuminated side of the array. Each anode contact of the detector elements of detector array 116 is thus independently connected to an input of a unit cell electronic circuit of readout integrated circuit 118. This traditional hybrid assembly of detector array 116 and readout integrated circuit 118 may still be used, but new technology may reduce inter-element coupling, or crosstalk, and reduce leakage (dark) current and improve efficiency of the individual detector elements of detector array 116. In a preferred embodiment, the elements of detector array 116 may be formed atop a substantially monocrystalline sapphire wafer. Silicon-on-sapphire (SOS) substrates with a thin layer of substantially monocrystalline silicon grown epitaxially thereon are available in the marketplace, and are well known for their superior performance characteristics. A detector array 116 of APD, PIN, or PN junction detectors may be formed of a sequence of layers of p-type and n-type silicon via epitaxial regrowth on the SOS wafers. Boron and aluminum may be used as dopants for any of the p-type silicon epitaxial layers. Phosphorus, arsenic, and antimony may be used as dopants for any of the n-type silicon epitaxial layers. Sapphire substrates with a thin layer of epitaxially grown monocrystalline gallium nitride are also available in the marketplace (gallium nitride on sapphire, or GNOS), and are widely known as substrates well suited to the fabrication of high brightness blue LEDs. A detector array 116 of APD, PIN, or PN junction detectors may be formed of a sequence of layers of p-type and n-type gallium nitride (GaN) or indium gallium nitride (InGaN) via epitaxial regrowth on the GNOS wafers. Silicon and germanium may be used as dopants for any of the n-type GaN layers. In some cases, magnesium may be used as a dopant for p-type layers in GaN. In a further development, detector array 116 may be fabricated monolithically directly atop readout IC 118. Detector array 116 may also be formed in a more conventional manner from compounds of indium gallium arsenide, indium aluminum arsenide, silicon carbide, diamond, mercury cadmium telluride, zinc selenide, or other well known semiconductor detector system. Readout integrated circuit 118 comprises a rectangular array of unit cell electrical circuits. Each unit cell has the capability of amplifying a low level photocurrent received from an optoelectronic detector element of detector array 116, and sampling the amplifier output. Typically the unit cell is also capable of detecting the presence of an electrical pulse in the unit cell amplifier output associated with a light pulse reflected from the scene and intercepted by the detector element of detector array 116. The detector array 116 may be an array of avalanche photodiodes, capable of photoelectron amplification, and modulated by an incident light signal at the design wavelength. The detector array 116 elements may also be a P-intrinsic-N design or N-intrinsic-P design with the dominant carrier being holes or electrons respectively; in which case the corresponding ROIC 118 would have the polarity of the bias voltages and amplifier inputs adjusted accordingly. The hybrid assembly of detector array 116 and readout integrated circuit 118 of the preferred embodiment is shown in FIG. 17, and the assembly is then mounted to a supporting circuit assembly, typically on a FR-4 substrate or ceramic substrate. The circuit assembly typically provides support circuitry which supplies conditioned power, a reference clock signal, calibration constants, and selection inputs for the readout column and row, among other support functions, while receiving and registering range and intensity outputs from the readout integrated circuit 118 for the individual elements of the detector array 116. Many of these support functions may be implemented in Reduced Instruction Set Computer (RISC) processors which reside on the same circuit substrate. A detector bias converter circuit 150 applies a time varying detector bias to the detector array 116 which provides optimum detector bias levels to reduce the hazards of saturation in the near field of view of detector array 116, while maximizing the potential for detection of distant objects in the field of view of detector array 116. The contour of the time varying detector bias supplied by detector bias converter 150 is formulated by control processor 94 based on feedback from the data reduction processor 126, indicating the reflectivity and distance of objects or points in the scene in the field of view of the detector array 116. Control processor 94 also provides several clock and timing signals from a timing core 100 to readout integrated circuit 118, data reduction processor 126, analog-to-digital converters 122, object tracking processor 134, and their associated memories. Control processor 94 relies on a temperature stabilized or temperature compensated frequency reference 148 to generate a variety of clocks and timing signals. Temperature stabilized frequency reference 148 may be a temperature compensated crystal oscillator (TCXO), dielectric resonator oscillator (DRO), or surface acoustic wave device (SAW). Timing core 100 resident on control processor 94 may include a high frequency tunable oscillator, programmable prescaler dividers, phase comparators, and error amplifiers.

Continuing with FIG. 8, control processor 94, data reduction processor 126, and object tracking processor 134 each have an associated memory for storing programs, data, constants, and the results of operations and calculations. These memories, each associated with a companion digital processor, may include ROM, EPROM, or other non-volatile memory such as flash. They may also include a volatile memory such as SRAM or DRAM, and both volatile and non volatile memory may be integrated into each of the respective processors. A common frame memory 130 serves to hold a number of frames, each frame being the image resulting from a single laser pulse. Both data reduction processor 126 and object tracking processor 134 may perform 3D image processing, to reduce the load on a scene processing unit 68 normally associated with ladar system controller 72. There are two modes of data collection, the first being SULAR, or a progressive scan in depth. Each laser pulse typically results in 20 "slices" of data, similar to a CAT scan, and each "slice" may be stored as a single page in the common frame memory 130. With each pixel sampling at a 2 nanosecond interval, the "slices" are each a layer of the image space at roughly 1 foot differences in depth. The 20 slices represent a frame of data, and the sampling for a succeeding laser pulse may be started at 20 feet further in depth, so that the entire image space up to 1000 feet in range or depth, may be swept out in a succession of 50 laser illuminating pulses, each laser pulse response consisting of 20 "slices" of data held in a single frame entry. In some cases, the frame memory may be large enough to hold all 50 frames of data. The number of slices stored could be enough to map out any relevant distance, with no trigger mode operation required. The reduction of the data might then take place in an external computer, as in the case of data taken to map an underwater surface, or a forest with tree cover, or any static landscape, where sophisticated post-processing techniques in software may yield superior accuracy or resolution. A second data acquisition mode is the TRIGGER mode, where the individual pixels each look for a pulse response, and upon a certain pulse threshold criteria being met, the 20 analog samples bracketing the pulse time of arrival are retained in the pixel analog memories, and a running digital counter is frozen with a nominal range measurement. The 20 analog samples are output from each pixel through the "A" and "B" outputs 120 of readout integrated circuit 118, which represent the interleaved row or column values of the 128×128 pixel of the present design. The "A" and "B" outputs 120 are analog outputs, and the analog samples presented there are converted to digital values by the dual channel analog-to-digital (A/D) converter 122. Interleaving the outputs means one of the outputs ("A") reads out the odd numbered lines of the readout IC 118, and the other output ("B") reads out the even numbered lines of the readout IC 118. Larger detector arrays 116 and readout ICs 118 may have more than two analog outputs. The digital outputs 124 of the A/D converters 122 connect to the inputs of the data reduction processor 126. A/D converters 122 may also be integrated into readout integrated circuit 118. The digital outputs are typically 10 or 12 bit digital representations of the uncorrected analog samples measured at each pixel of the readout IC 118, but other representations with greater or fewer bits may be used, depending on the application. The rate of the digital outputs depends upon the frame rate and number of pixels in the array. In TRIGGER mode, a great deal of data reduction has already transpired, since the entire range or depth space may be swept out in the timeframe of a single laser pulse, and the data reduction processor 126 would only operate on the 20 analog samples stored in each unit cell in order to refine the nominal range measurement received from each pixel (unit cell) of the array. The data reduction processor 126 refines the nominal range measurements received from each pixel by curve fitting of the analog samples to the shape of the outgoing laser illuminating pulse, which is preserved by the reference ARC pulse signal. These pulses are typically Gaussian, but may be square, trapezoidal, haversine, sinc function, etc., and the fitting algorithms may employ Fourier analysis, Least Squares analysis, or fitting to polynomials, exponentials, etc. The range measurements may also be refined by curve fitting to a well known reference pulse characteristic shape. In TRIGGER acquisition mode, the frame memory 130 only needs to hold a "point cloud" image for each illuminating laser pulse. The term "point cloud" refers to an image created by the range and intensity of the reflected light pulse as detected by each pixel of the 128×128 array of the present design. In TRIGGER mode, the data reduction processor 126 serves mostly to refine the range and intensity (R&I) measurements made by each pixel prior to passing the R&I data to the frame memory 130 over data bus 128, and no "slice" data or analog samples are retained in memory independently of the R&I "point cloud" data in this acquisition mode. Frame memory 130 provides individual or multiple frames, or full point cloud images, to control processor 94 over data bus 144, and to an optional object tracking processor 134 over data bus 132 as required.

As shown in FIG. 8, data reduction processor 126 and control processor 94 may be of the same type, a reduced instruction set (RISC) digital processor with hardware implementation of integer and floating point arithmetic units. Object tracking processor 134 may also be of the same type as RISC processors 126 and 94, but may in some cases be a processor with greater capability, suitable for highly complex graphical processing. Object tracking processor 134 may have in addition to hardware implemented integer and floating point arithmetic units, a number of hardware implemented matrix arithmetic functions, including but not limited to; matrix determinant, matrix multiplication, and matrix inversion. In operation, the control processor 94 controls readout integrated circuit 118, A/D converters 122, frame memory 130, data reduction processor 126 and object tracking processor 134 through a bidirectional control bus 146 which allows for the master, control processor 94 to pass commands on a priority basis to the dependent peripheral functions; readout IC 118, A/D converters 122, frame memory 130, data reduction processor 126, and object tracking processor 134. Bidirectional control bus 146 also serves to return status and process parameter data to control processor 94 from readout IC 118, A/D converters 122, frame memory 130, data reduction processor 126, and object tracking processor 134. Data reduction processor 126 refines the nominal range data and adjusts each pixel intensity data developed from the digitized analog samples received from A/D converters 122, and outputs a full image frame via unidirectional data bus 128 to frame memory 130, which is a dual port memory having the capacity of holding several frames to several thousands of frames, depending on the application. Object tracking processor 134 has internal memory with sufficient capacity to hold multiple frames of image data, allowing for multi-frame synthesis processes, including video compression, single frame or multi-frame resolution enhancement, statistical processing, and object identification and tracking. The outputs of object tracking processor 134 are transmitted through unidirectional data bus 136 to a communications port 102, which may be resident on control processor 94. All slice data, range and intensity data, control, and communications then pass between communications port 102 and a centralized ladar system controller 72, (FIGS. 5,6) through bidirectional connections 50. Power and ground connections (not shown) may be supplied through an electromechanical interface. Bidirectional connections 50 may be electrical or optical transmission lines, and the electromechanical interface may be a DB-25 electrical connector, or a hybrid optical and electrical connector, or a special automotive connector configured to carry signals bidirectionally for the ladar sensor 46. Bidirectional connections 60 would connect to ladar system controller 72 for an auxiliary lamp assembly which may have a short range ladar sensor 52 embedded therein. Bidirectional connections 50 (60) may be high speed serial connections such as Ethernet, Universal Serial Bus (USB), or Fibre Channel, or may also be parallel high speed connections such as Infiniband, etc., or may be a combination of high speed serial and parallel connections, without limitation to those listed here. Bidirectional connections 50 (60) also serve to upload information to control processor 94, including program updates for data reduction processor 126, object tracking processor 134, and global position reference data, as well as application specific control parameters for the remainder of the ladar sensor 46 functional blocks. Inertial and vertical reference 84 (see FIG. 6) also provides data to the short range ladar sensors 52-58 and long range ladar sensors 46-48 from the host vehicle 2 through the vehicle electrical systems and CPU 80 and the ladar system controller 72 as needed. Likewise, any other data from the host vehicle 2 which may be useful to the ladar sensor 46 may be provided in the same manner as the inertial and vertical reference data. Inertial and vertical reference data may be utilized in addition to external position references by control processor 94, which may pass position and inertial reference data to data reduction processor 126 for adjustment of range and intensity data, and to object tracking processor 134 for utilization in multi-frame data synthesis processes. The vertical reference commonly provides for measurement of pitch and roll, and is adapted to readout an elevation angle, and a twist angle (analogous to roll) with respect to a horizontal plane surface normal to the force of gravity. The short range ladar sensors 52-58 typically employ a semiconductor laser, which may be modulated in several different ways. The long range ladar sensors 46-48 typically employ a q-switched solid state laser, which produces a single output pulse with a Gaussian profile if properly controlled. The pulse shape of a solid state laser of this type is not easily modulated, and therefore must be dealt with "as is" by the receiver section of a long range ladar sensor 46-48. The operations of short range ladar sensors 52-58 of the type which are typically embedded in an auxiliary lamp assembly such as a taillight, turn signal, or parking light are the same as the operations of the long range ladar sensors 46-48 with some exceptions. The long range ladar sensors 46-48 and short range ladar sensors 52-58 may differ only in the type of laser employed and the type of laser modulation. The transmit optics 110 and receive optics 112 may also differ, owing to the different fields of view for long range ladar sensors 46-48 and short range ladar sensors 52-58. Differences in the transmitted laser pulse modulation between the long range ladar sensors 46-48 and short range ladar sensors 52-58 may be accommodated by the flexible nature of the readout IC 118 sampling modes, and the data reduction processor 126 programmability. The host vehicle 2 may have a number of connector receptacles generally available for receiving mating connector plugs from USB, Ethernet, RJ-45, or other interface connection, and which may alternatively be used to attach long range ladar sensors 46-48 or short range ladar sensors 52-58 of the type described herein.

Continuing with FIG. 8, it is useful to discuss a short range ladar sensor 52 variant. In a short range ladar sensor 52, considerably less transmit power is required, allowing for the use of a semiconductor laser and multi-pulse modulation schemes. One example of a semiconductor laser is the vertical cavity surface emitting laser (VCSEL), used in a preferred embodiment because of a number of preferential characteristics. A VCSEL typically has a circular beam profile, and has lower peak power densities at the aperture. VCSELs also require fewer secondary mechanical operations, such as cleaving, polishing, etc., and may be formed into arrays quite easily. The use of a semiconductor laser allows for the tailoring of a drive current pulse so as to produce a Gaussian optical pulse shape with only slight deviations. The VCSEL response time is in the sub-nanosecond regime, and the typical pulse optical width might be 5-100 nanoseconds at the half power points. In the diagram of FIG. 8, the VCSEL and laser driver would be part of the pulsed laser transmitter 106, and the desired pulse or waveshape is itself produced by a digital-to-analog converter 96 which has a typical conversion rate of 200-300 MHz, so any deviations in the output pulse shape from the Gaussian ideal may be compensated for in the lookup table in memory 98 associated with control processor 94, which serves as the digital reference for the drive current waveform supplied to the laser driver within pulsed laser transmitter 106 by the D/A converter. A Gaussian single pulse modulation scheme works well at short ranges, given the limited optical power available from a VCSEL. Extending the range of a VCSEL transmitter may be done using more sophisticated modulation schemes such as multi-pulse sequences, sinewave bursts, etc. The VCSEL and modulation schemes as described herein with reference to short range ladar sensor 52 are an alternative to the solid state laser typically used in a pulsed laser transmitter 106 of a long range ladar sensor 46. The use of a VCSEL array in pulsed laser transmitter 106 has the potential to reduce cost, size, power consumption, and/or enhance reliability. Ladar sensors may be mounted at many points on the vehicle 2; headlamps, auxiliary lamps, door panels, rear view mirrors, bumpers, etc. When equipped with a more sensitive detector array 116 such as an image tube FPA, a ladar sensor of the type described herein may use a VCSEL array as an illuminating source, and much longer ranges may be supported. When referring to the major functions of the ladar sensor of FIG. 8, it is sometimes convenient to refer to the "optical transmitter" as those functions which support and/or create the burst of light for illuminating the scene in the field of view. These elements would typically be the control processor 94 which starts the process, pulsed laser transmitter 106, transmit filter 108, and transmit optics 110. The term "optical receiver" may be used to refer to those elements necessary to collect the light reflected from the scene in the field of view, filter the received light, convert the received light into a plurality of pixilated electrical signals, amplify these pixilated electrical signals, detect the pulses or modulation thereon, perform the range measurements, and refine or reduce the received data. These functions would include the receive optics 112, receive filter 114, detector array 116, readout IC 118, A/D converters 122, and the data reduction processor 126.

Figure 9:
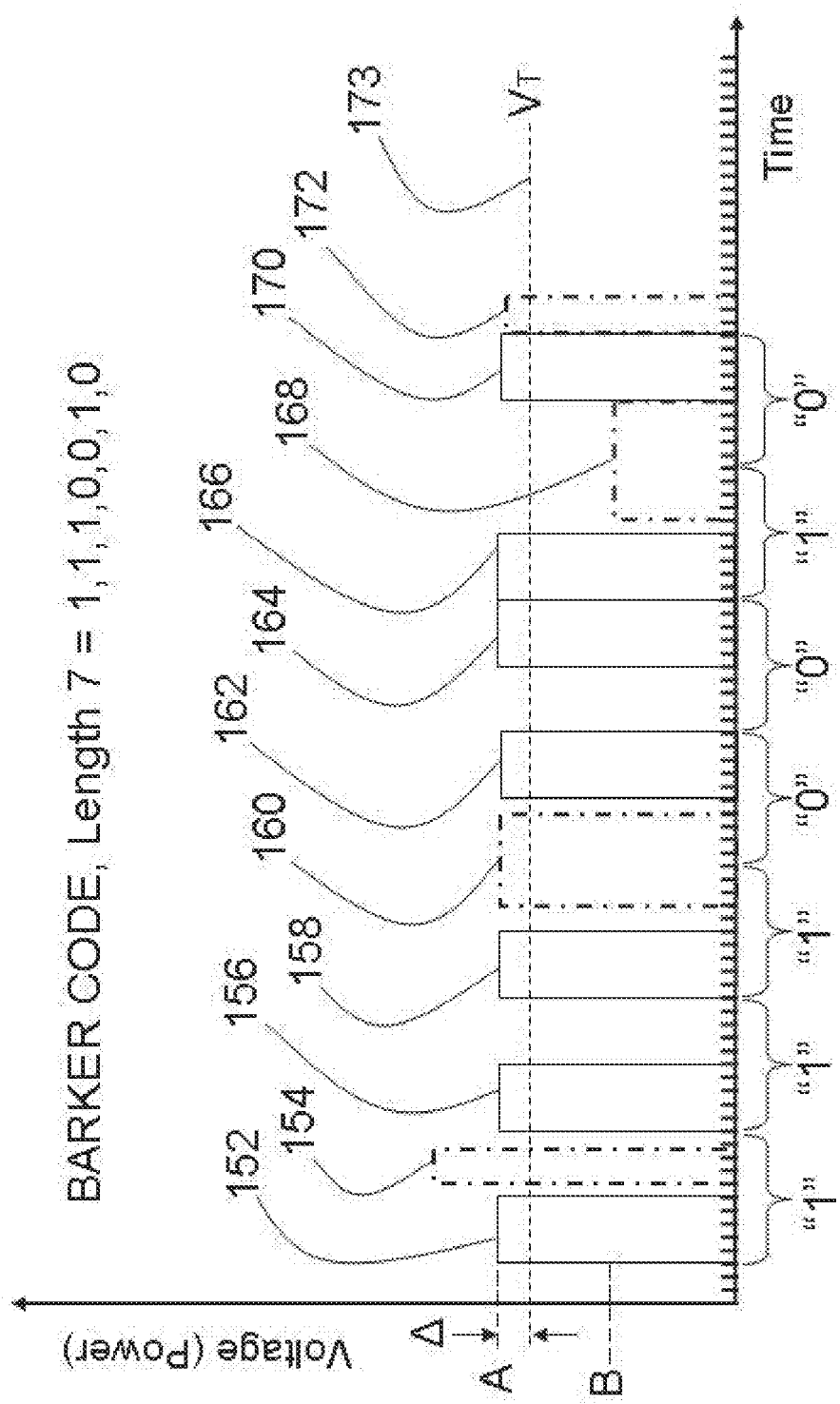
FIG. 9 is diagram showing the time line of a laser pulse train received from the field of view of a LADAR sensor typical of the design, which shows both the nature of the desired pulses, their encoding method, and the presence of interfering, or spurious pulses from adjacent LADAR transmitters in the field of view.

FIG. 9 is a diagram which illustrates some advantages of the laser modulation scheme of the preferred embodiment of short range ladar sensor 52. The use of a semiconductor laser allows for rapid modulation of the laser output power. A number of voltage pulses made up of analog samples are plotted horizontally on the time axis. These waveforms start as reflected optical power pulses which are detected and converted to current pulses by the individual detector elements 282 of detector array 116. The current pulses become voltages when amplified by a transimpedance amplifier of the associated unit cell electrical circuit of readout integrated circuit 118 (detailed description FIG. 15). In the diagram of FIG. 9, a Manchester encoded Barker code of length 7 is used to illustrate the power of an optimal coding sequence. The first 5 nS pulse 152 is the result of Manchester encoding the first "1" bit of the Barker code sequence. Manchester encoding produces a DC balance in the signal, and also limits the maximum width of laser pulses to be the same as the bit time (10 ns). If the Barker sequence were transmitted unmodified, there could be a laser pulse 3× the bit time (30 nS), as can be seen from the diagram, where the sequence leads with a 1,1,1. First pulse 152 is 5 ns wide, and represents a data bit "1" as it lies in the left half of the first time slot. In this example, the Manchester encoding is done by a logical XOR of the code bit "1" with the inverted clock. Interfering pulse 154 is received from an unknown ladar type, as it is only 3 ns in width, and is thus an invalid signal from the standpoint of the ladar sensor 52 receiver. In single pulse modulation schemes, a simple pulse width discriminator (PWD) will reject spurious pulses such as pulse 154 having an improper width. In the dense ladar environment of FIG. 2, the assignment of 145 independent wavelengths together with the assignment of differing pulse widths, allows for the seamless interoperation of a multiplicity of ladar sensors within the same space. For example, pulse widths can be assigned in 3 ns, 5 ns. 7 ns, 9 ns, 11 ns, 13 ns, 15 ns, 17 ns, and 19 ns widths. In this simplest of systems, the combination of 145 independent wavelengths with 9 different pulse widths makes for over 1400 random combinations of ladar sensors operating in the same space, and transmitting in the same time interval, without any impairment of the overall system functioning.

Additionally, each ladar sensor in the dense ladar environment may be programmed to continuously "chirp", or vary the frequency at which image frames are being acquired. This mode of operation requires each ladar which may have a nominal 20 Hz acquisition rate for each frame of data, to continuously or randomly vary the acquisition rate from 18 Hz to 22 Hz, or about a 10%/o variation in rates. At 20 Hz, the interval between frame acquisitions is nominally 50 ms. In the preferred embodiment, long range ladar sensors 46, 48 operate at this 20 Hz nominal rate, but vary the intervals between laser pulse transmission sequences from 45 ms to 55 ms, in some instances randomly, and in other instances in a predetermined pattern. The short range ladar sensors 52-58 typically operate at higher frame rates of 30 Hz, or 33 ms intervals and vary their acquisition schedules +/−10% randomly or in a predetermined pattern as well. The effect of this acquisition rate variation is to reduce the probability of pulses from adjacent ladars crossing in space, or interfering with the pulses of nearby ladar sensors for any appreciable period of time. For a single vehicle, the ladar system controller 72 may ensure there is no overlap between the multiple ladar sensor pulse transmission sequences, by staggering the initiation signals to each ladar sensor of the system in a controlled manner.

Continuing the discussion of FIG. 9, the unique Barker codes are of length 2, 3, 4, 5, 7, 11, 13. If the Barker code of length 7 is also Manchester encoded, the second pulse 156 will also appear in the left half of the second time slot (logical "1), as will the third pulse 158. When the fourth code bit ("0") is encoded, pulse 162 appears in the right half of the 4th time slot, leaving a 10 ns gap. An interfering pulse 160 which is 7 ns in width may be rejected by a pulse width discriminator, or by a more complex filtering scheme which works with the entire Barker code sequence. A fifth pulse, 164 appears in the right half of the 5th time slot, indicating a "0". Sixth pulse 166 appears back-to-back with pulse 164, as the code has reversed from a "0" to a "I" The appearance of 5th pulse 164 and 6th pulse 166 back-to-back would require a second pulse width discriminator which works with 10 ns pulses to allow 5th pulse 164 and 6th pulse 166 to propagate through the system if pulse width discrimination is the only timing technique used to validate pulses, or sequences thereof. A more sophisticated technique is described below which works with the entire coded sequence of pulses. Continuing with FIG. 9, an interfering pulse 168 which is 9 ns in width then appears, followed by the 7th pulse 170, appearing in the right half of the 7th time slot, indicating a "0" in the code. An interfering pulse 172, 3 ns wide, appears at the same height and directly after pulse 170. Interfering pulse 154 may be rejected by a pulse width discriminator, as it is only 3 ns wide and appears at a different amplitude from the Manchester encoded pulses of the Barker code sequence. Interfering pulse 160 is a more difficult case, as the 7 ns pulse only differs in width, yet may also be rejected by a pulse width discriminating filter. Interfering pulse 168 is 9 ns wide and therefore clearly spurious, but appears back-to-back with pulse 170, making it more difficult to process. The use of a pulse detection threshold 173 makes it possible to reject interfering pulse 168. Pulse detection threshold voltage VT 173 may be set by detecting the peak amplitude of the compliant 5 ns pulses such as first pulse 152, and reducing the voltage by an amount ΔV, so a voltage comparison can be made against the detected power in the stream of pulses. Interfering pulse 172 is the most difficult to process, because it is back-to-back with 7th pulse 170, and it is of the proper amplitude. The only way to properly reject this pulse is to employ a digital filtering algorithm which looks at the entire pulse sequence in parallel.

Figures 10, 11:
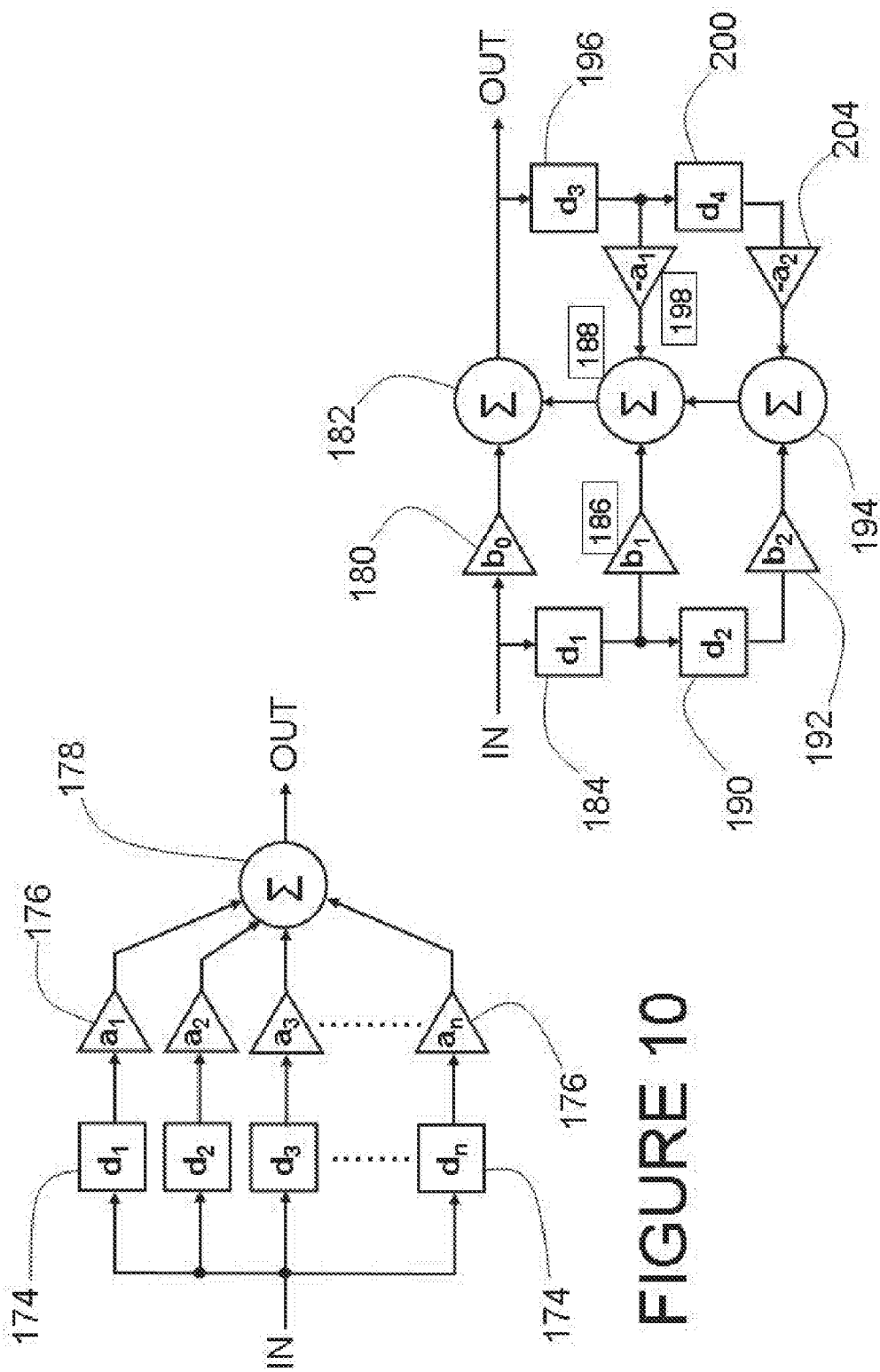
FIG. 10 is diagram showing a pulse width discriminator implemented as a digital finite-impulse-response (FIR) filter.
FIG. 11 is diagram showing a pulse width discriminator implemented as a digital infinite-impulse-response (IIR) filter.

FIG. 10 is a block diagram showing a first type of digital filter, the finite impulse response filter (FIR). In the simplest encoding mechanism described herein, the FIR filter of FIG. 10 operates to reject pulses having a width less than or greater than the pulse width assigned to the companion transmitter of the ladar sensor 52. The block diagram is in most cases a flowchart for a series of program steps to be taken by data reduction processor (126 in FIG. 8), but may alternatively be hardware implemented in a configurable data reduction processor 126 with some speed enhancement expected. The input is a series of reflected pulses, spurious pulses, and noise. The samples d1, d2, d3, . . . dn, 174 are 8 bit digital representations of the received and detected input taken at 1ns intervals, and are stored in a fast memory block within a data reduction processor 126. In the simplest signalling scheme of a single illuminating pulse, there would be 3 ns, 5 ns, 7 ns, 9 ns, 11 ns, 13 ns, 15 ns, 17 ns, and 19 ns pulse widths. Using a ladar sensor 52 having a 3 ns pulse width as an example; a 3 ns pulse sampled at 1 ns intervals or slightly faster would have at minimum 3 samples at the peak amplitude of the pulse, and at minimum, if only a single illuminating pulse is emitted, there should be at least 3 samples on either side of the pulse with zero amplitude, or amplitude below the threshold voltage VT. Setting threshold voltage VT would typically be a first operation in the FIR filter algorithm. This means a digital FIR filter could use analog samples d1-d9, each sample in time about 1 ns later than the previous sample. Any analog sample d1-d9 above threshold VT would have a value of +1 substituted in the algorithm in place of the actual samples d1-d9. Any samples d1-d9 having an amplitude below threshold VT would have a value of −1 substituted for the sake of processing in the filter. The gain constants a1-a9 176 then would be set as follows: a1-a3=−1, a4-a6=+1, and a7-a9=−1. Thus, when the pulse is properly aligned in the filter, a score of +9 will appear at summation point 178, giving a high degree of confidence the pulse is a valid 3 ns reflected optical pulse. This property of the digital FIR filter is termed processing gain. Any pulses having a width less than 3 ns will produce a lower score, and those having widths greater than 3 ns will also produce a lower score at the summation point. 178. The data reduction processor can then make informed decisions about which pulses to process for range information.

The FIR filter of FIG. 10 can also operate without the use of a threshold comparison, in something like a full analog mode. In the second mode, a level B is found corresponding to the halfway point between the peak level at A and the background noise level, or negative peak in the signal. All samples are then reduced by the value of B (see FIG. 9), and these new values substituted into the algorithm, leaving some samples with positive values (the 3 ns pulse would have d4-d6 with positive sign), and other samples having negative values (d1-d3, and d7-d9). This form of processing may yield better results in some noisy environments, or where signal amplitudes are low, as the case may be at the extreme range of the ladar sensor 52. With respect to issues raised by interfering pulse 172, a third mode is provided for the ladar sensor 52 by the data reduction processor 126. In the third mode, the entire sequence of the Manchester encoded Barker code may be sensed in parallel by the data reduction processor acting as a code sequence correlator, rather than simply sequentially filtering each pulse for width and amplitude characteristics as would be typical in a single pulse modulation scenario. In this third scenario, code sequence correlation (CSC), the number of samples could be quite large. In the sequence shown in FIG. 9, there are 7 time slots each yielding 10 samples at 1ns intervals, which would give a score of 70 at the summation point 178 in the absence of noise or interfering pulses. If the only interfering pulse present were the 3 ns pulse 154, then the score at the summation point would only be reduced to 67, and the data reduction processor in a typical scenario would process the pulse sequence of FIG. 9 with a high degree of confidence it is a valid reflected pulse sequence. Further encoding at a higher level treats each complete Barker code sequence as a digital "1" or "0" as part of a vehicle identifying number. In the example of FIG. 9, multiple Barker code 7 sequences may be transmitted, with each Barker code sequence having the phase of the encoding clock inverted for a "0" transmission, and the non-inverting clock used for a digital "1" representation. In this manner, a 4-bit vehicle ID number, would take 280 ns given the Barker 7 encoding scheme. In practice, unique vehicle ID numbers are of much greater length, but the example is useful as an illustration of the possibilities for ensuring the uniqueness of received optical pulse sequences with the structures described by FIGS. 8, 10, & 11.

FIG. 11 is a block diagram of another type of digital filter which uses active feedback to sharpen the response of the filter. In this filter, digital samples are cycled back through the filter from the initial output, and a non-linear response may be effected. This type of filter is termed an infinite impulse response filter (IIR), so called because it is possible for the impulse response of this type of filter to continue on indefinitely. The IIR filter of FIG. 11 may be a structure which reduces the number of calculations and complexity for a given filter performance as compared to the FIR filter of FIG. 10. In operation, digital representations of analog samples appear as inputs at the left of FIG. 11. The non-delayed input (first sample) is first multiplied by the value of b0 180, and summed in summing junction 182. A delay d1 184 is also applied to this initial input, and the value multiplied by constant b1 186 before being summed at summing junction 188. The delay d1 is typically the same as the time between the digitized analog samples presented at the input. A second delay d2 (typically d2=d1) 190 is then applied to the initial input (first sample) and this value is multiplied by constant b2 192 and summed in summing junction 194. Digitized analog samples are meanwhile being continuously presented at the filter input, so by the time the first sample reaches summing junction 194, a second sample is being presented at summing junction 188, and a third sample is being presented at summing junction 182. On the output side, the initial output is delayed by delay d3 196 and multiplied by constant −a1 198 before being presented at summing junction 188. The output of summing junction 188 is then fed back to summing junction 182 as an input. The output delay d3 196 is typically the same as d1 and d2. A second delay, d4 200 is applied to the d3 delayed filter output, which is then multiplied by constant −a2 204 and presented at summing junction 194. Typically d4=d3=d2=d1. The output of summing junction 194 is then presented as a feedback input to summing junction 188. It can be seen from this description, the digitized analog samples may make several passes through the summing junction 182, depending on their value and the value of the constants b0-b2, and −a1, −a2. Therefore, this type of filter is also known as a recursive filter. The number of delays and summing junctions may be made arbitrarily longer, and the constants varied so very little feedback is used, or a great deal, depending on the design and application. Other topologies are also possible, though most are some variant of the generic IIR filter described here. This filter may be used as an efficient, high performance pulse width discriminator as an alternative to the FIR filter of FIG. 10. It can be seen from the descriptions of the digital processes described in relation to FIGS. 10 & 11, there will need to be a fast digital processor. In preferred embodiments, a number of fast math processors are required to filter and curve fit the raw data, identify and track objects, compose the scene surrounding the vehicle, merge 3D and 2D images, and control the ladar sensors onboard the vehicle. To facilitate this design objective, a RISC processor has been designed which may be used interchangeably for these tasks. This RISC processor has been optimized to execute floating point (FP) and integer operations in particular.

Figure 12:
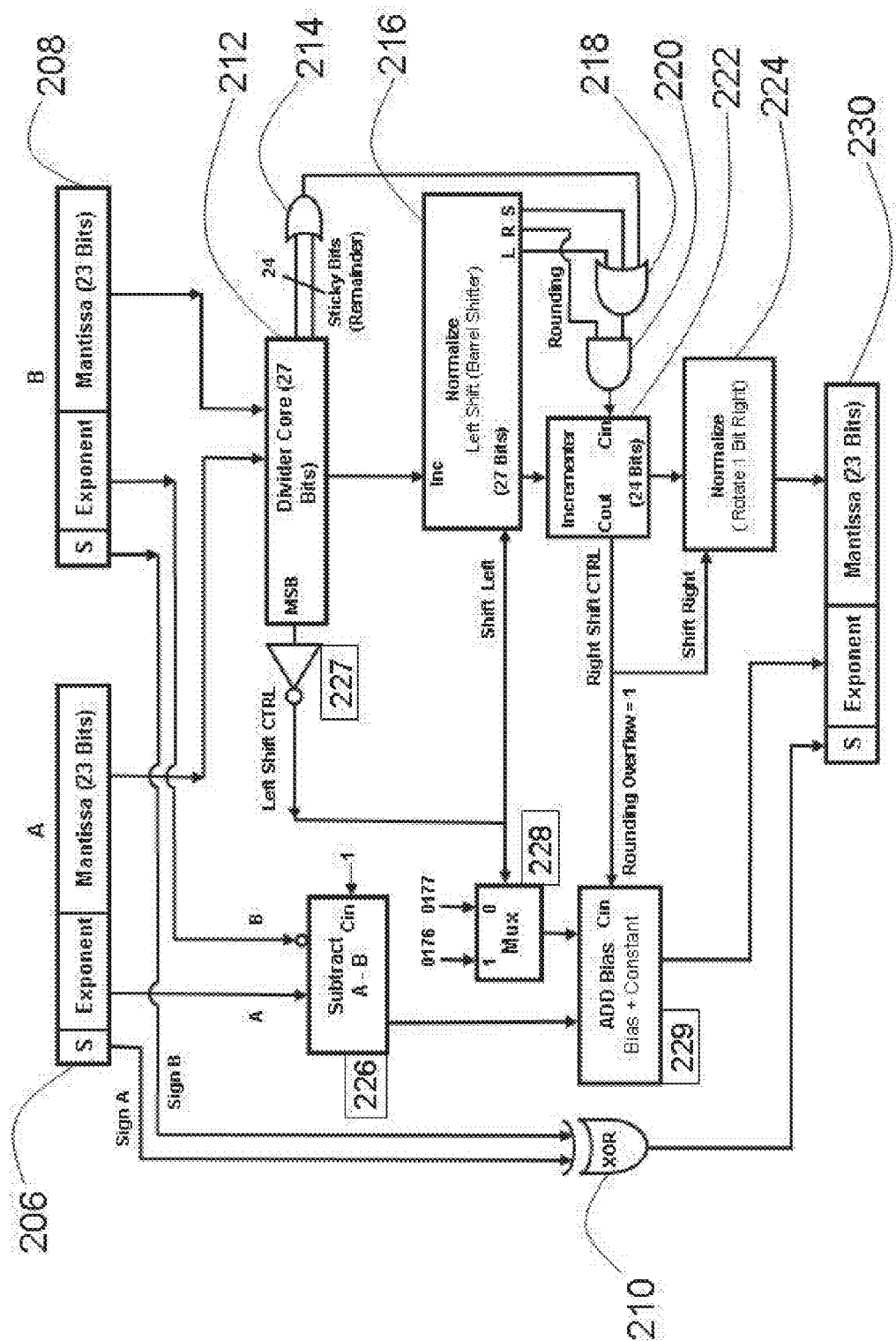
FIG. 12 is a block diagram of a new floating point (FP) hardware divide structure which by the unique design features, executes a FP divide faster than conventional hardware FP dividers.

FIG. 12 is a block diagram of an optimized floating point (FP) divider. In this diagram, A is the dividend and B the divisor. The divider core 212, which carries out the division of the mantissas of the A and B operands, is comprised of a divider tree commonly used in integer divide hardware implementations. Normally, the divider circuit in floating point arithmetic circuits is actually realized using a multiply and accumulate circuit, as it is less complicated, has fewer transistors, and therefore less circuit real estate. The normal course involves an initial estimate, and a number of iterative cycles using the Newton-Raphson method to refine the estimate based on the error. The users and applications programmers of standard FP arithmetic processors are typically encouraged to find ways to reduce or eliminate occasions for the division of FP operands, and in many cases, this is possible. In the case of the operations required to process the raw data from a LADAR of the type described herein, and also to merge 3D image data with 2D image data, and to perform object recognition and tracking, it is very useful to have the option of a fast executing FP divider.

Dividend A and divisor B are floating point representations of real numbers according to the IEEE 754 standard. Each operand is made up of a 23 bit mantissa and an 8 bit biased exponent, plus a sign bit, allowing for the 32-bit floating point representation (single precision) and storage in a 32 bit register. An additional "hidden" bit of the mantissa is always a leading 1, which is implied. Prior to storing each FP number, it is normalized to have a leading 1, which is then truncated to give an additional bit of effective precision. As a first step in the division operation, dividend A and divisor B are unpacked, and, the "hidden" bit is restored, resulting in a 24 bit mantissa which is then provided as an input to the divider core 212. The 24 bit mantissa can also be registered just as the operands are registered in registers 206, 208, to speed up computation (method of pipelining). This method also avoids the potential for a trivial result from divider core 212 when the mantissas are divided. The division process may be seen as three separate computation flows, the sign bits, the exponents, and the mantissas. The sign bits are input to XOR gate 210, and the resulting output registered as the sign of the quotient in output register 230. In parallel, the exponents are subtracted (A–B) in subtract block 226. The carry in (Cin) bit is set to "1" to force the 2's complement of input B, resulting in the subtraction operation being performed by subtract block 226. The resulting exponent then will have the bias added in by the add bias block 229. If the mantissa divide operation in divider core 212 results in a quotient with an MSB equal to "0", inverter 227 puts out a "1", and MUX 228 selects the smaller number 0176 octal to be added in as bias to the exponent by the add bias block 229. If the mantissa divide operation results in an MSB=1, then inverter 227 produces a "0", and the MUX 228 selects the larger number 0177 octal to be added in as the bias to the exponent by the add bias block 229. The add bias block 229 also will cause a "1" to be added to the exponent if the carry in (Cin) bit is a "1". This carry in bit could be the result of overflow in the rounding operation. The output of add bias block 229 is then registered as the exponent in output register 230.

Figure 13:
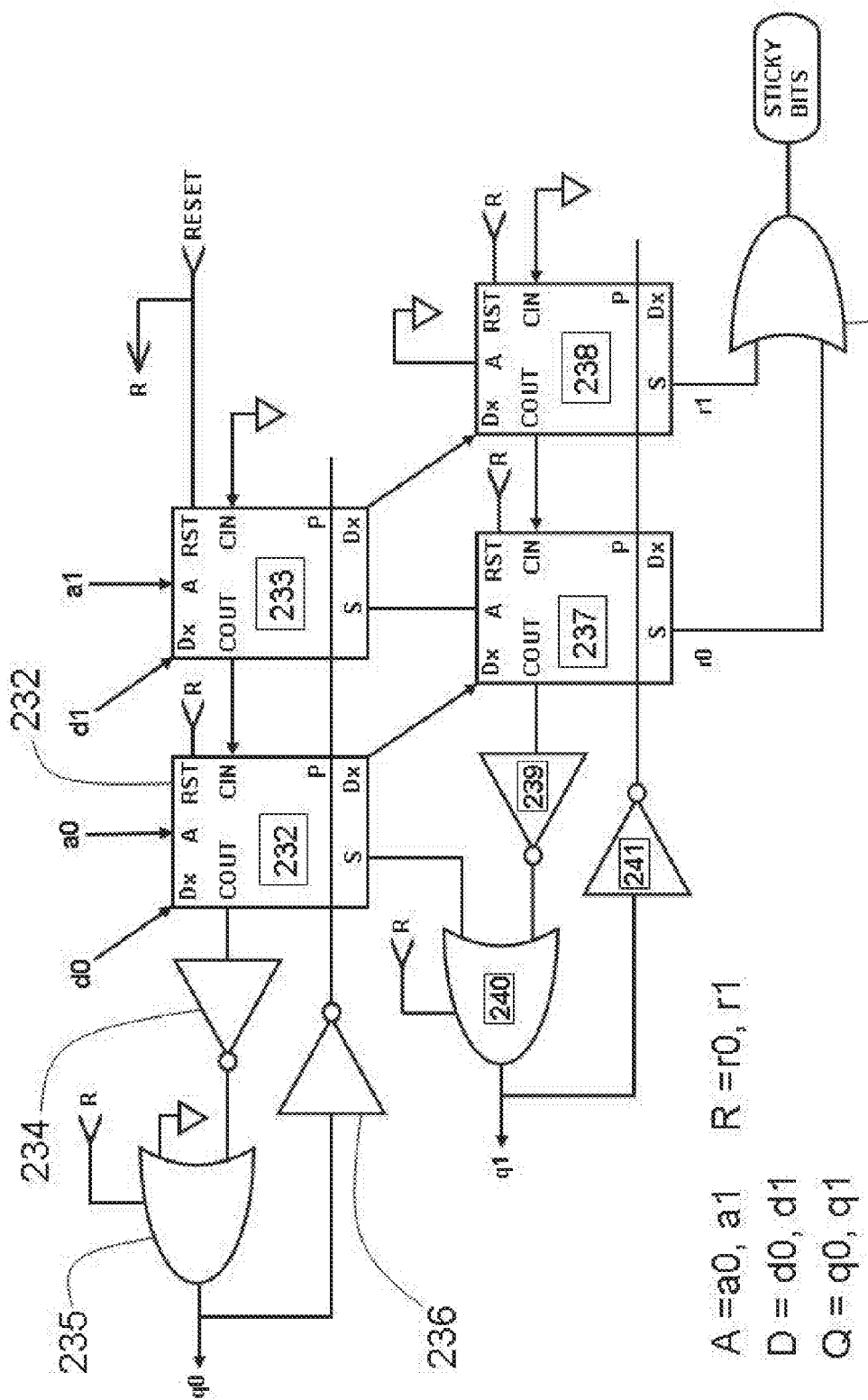
FIG. 13 is a schematic diagram of a 2×2 divider core having the same structure, though on a smaller scale, as the divider core block of 27 bits of FIG. 12.

Continuing with FIG. 12, the mantissa of A is divided by the mantissa of B in the divider core 212 using a divider tree of controlled subtractor (CS) cells as shown in FIG. 13. The 24 remainder outputs are ORed together in a 24 input OR gate 214, and the results forwarded to the rounding logic gates 218 and 220. The barrel shifter 216 left shifts the output of the divider core 212 if the MSB of the output of the divider core 212 is zero. If the MSB of the mantissa divide operation is zero, the inverter 227 will produce a "1" at the output and the barrel shifter 216 will left shift the mantissa quotient, creating a normalized result. Rounding logic OR gate 218 produces the logical OR of the remainder of the mantissa divide operation (OR gate 214 output) with the "L" and "S" outputs of the normalized quotient produced by barrel shifter 216. The "L" output is the least significant bit of the normalized mantissa, and the "S" bit is the "sticky" bit, or remainder of the normalized quotient. If any of these three inputs are TRUE, the output of OR gate 218 will be TRUE, and if the "R" (rounding) bit of the normalized output is TRUE, then the output of AND gate 220 will be TRUE, and the incrementer 222 will add a "1" to the 24 most significant bits of the normalized mantissa. Otherwise, no operation takes place. If the operation of the incrementer 222 produces a carry out (Cout), then the 24 bit mantissa will be later normalized by shifting to the right one place in the barrel shifter 224, and the exponent will be incremented in the add bias block 229 due to the presence of a "1" at the Cin input. Next, the "hidden bit" is stripped from the 24 bit mantissa which is then registered in output register 230.

FIG. 13 is a schematic diagram of the internal workings of a 2×2 divider core organized in the same fashion as the 24×24 divider core 212 of FIG. 12. A 2×2 core is chosen for simplicity in illustrating the technology, as the divider tree for a 24×24 is quite large, and repetitive in nature, and does not fit legibly on a single page. Each row of the divider tree is composed of identical hardware, with identical connections, with the exception of the top row, and the bottom row. In the top row, controlled subtractor cell (CS) 232 is connected to a RESET input, as is every CS cell in the tree structure. The CS cell 232 is also connected to a mode control, P. Mode control P forces the CS cell 232 to subtract the Dx input from the A input to the cell when P=0. If P=1, no operation takes place and A is passed through to the S output. The first CS 232 in the top row has a Dx input connected to the MSB of the divisor, d0, and the A input connected to the MSB of the dividend a0. First CS 232 in the top row also has a carry in (Cin) input connected to the carry out (Cout) of the CS cell 233 to the immediate right. The Cout from the first CS cell 232, top row, is connected to the input of an inverter 234 which has an output connected to the input of an OR gate 235. The second input of the OR gate 235 at the left of the top row is connected to digital ground, so it operates essentially as a buffer with the proper time delay for the divider tree. The output of this first OR gate 235 is q0, the MSB of the quotient, and is connected to an inverter 236. The output of inverter 236 is the mode control (P) for the top row. The difference output (S) of the first CS cell 232 is connected to an input of the mode control logic for the next lower row, OR gate 240. The first CS cell 232 also passes the MSB of the divisor, d0 directly to the Dx input of the first cell 237 in the adjacent lower row. The second CS cell in the top row 233 is also the rightmost cell of the top row, and therefore has a carry in input (Cin) connected to digital ground. The second CS cell 233 in the top row has a Dx input connected to the second bit of the divisor, d1, and the A input connected to the second bit of the dividend a1. The difference output (S) of the second CS cell 233 is connected to the A input of the first CS cell 237 of the next lower row. The second CS cell 233 also passes the second bit of the divisor, d1 directly to the Dx input of the second cell 238 in the adjacent lower row.

Continuing with FIG. 13, the second row and lower rows are organized identically to the top row, though the input connections to the second row are different than the top row. The first CS 237 in the second row has a Dx input connected to the MSB of the divisor, d0, which has been passed through the first CS cell of the top row 232. The A input of the first CS cell of the second row 237 is connected to the difference output S of the second cell of the top row 233. First CS cell 237 in the second row also has a carry in (Cin) input connected to the carry out (Cout) of the CS cell 238 to the immediate right. The Cout from the first CS cell 237 in the second row, is connected to the input of an inverter 239 which has an output connected to the input of an OR gate 240. The second input of the OR gate 240 at the left of the second row is connected to the difference output S of the first CS cell 232 of the top row. The output of this OR gate 240 is q1, the second bit of the quotient, and is also connected to an inverter 241. The output of inverter 241 is the mode control (P) for the second row. The difference output (S) of the first CS cell 237 of the second row (last row) is connected to a first input of an OR gate 214 which determines if there are any remainder bits in the operation. The first CS cell 237 of the second row does not have any connection to the Dx output, as it is also the last row in this case. The second CS cell in the second row 238 is also the rightmost cell of the second row, and therefore has a carry in input (Cin) connected to digital ground, and the A input connected to digital ground as well. The second CS cell 238 in the second row has a Dx input connected to the second bit of the divisor, d1. The difference output (S) of the second CS cell 238 of the second row (last row) is connected to a second input of an OR gate 214 which determines if there are any remainder bits in the operation. The output of OR gate 214 indicates the presence of a remainder from the divide operation of the divider core 212. The output of the OR gate 214 is labeled as STICKY bit. The MSB of the remainder r0, is the (S) output of the first CS cell 237 of the last row. The second bit of the remainder, r1, is the (S) output of the second cell of the last row 238, etc. The results of this structure, which has been developed for the FP divide, are indicative of the usefulness of the approach. In a typical FP divide, the result would normally be available in 34 ns assuming a 40 nm digital IC design rule process. Using the integer divider tree of the instant invention, the process completes in 3-4 ns. A roughly 10:1 improvement in throughput is therefore the result of using the integer divider tree as opposed to the standard method using an initial estimation and the Newton-Raphson iteration.

Figure 14:
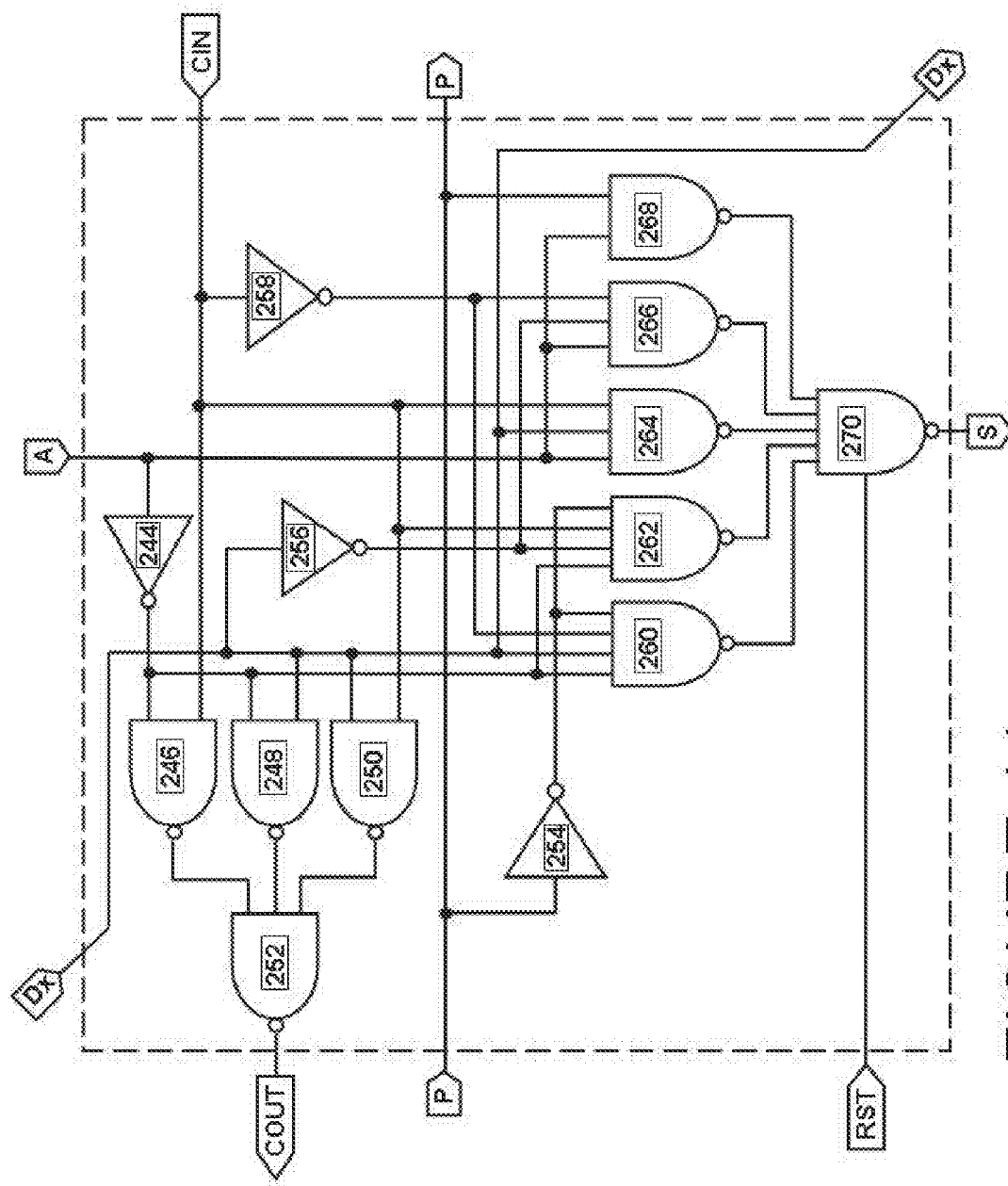
FIG. 14 is an internal schematic diagram of the controlled subtractor (CS) cell typical of the 4 CS cells of FIG. 13.

FIG. 14 is a schematic diagram of the controlled subtractor (CS) cell design of CS cells 232, 233, 237, 238 of FIG. 13. In this diagram, the input Dx is the subtrahend, the number to be subtracted. The A input is the minuend, the number which is to be reduced by the subtrahend Dx. Cin is the carry input from an identical CS cell to the right, and Cout is the carry out output to be propagated to the left in a divider tree. Mode control "P" forces a no-operation if held high and allows A to pass through to the S output; if driven low, it enables the CS cell to operate. A RESET input sets the initial difference output (S) to zero. The difference output S and Cout indicates the results of the operation A-Dx-Cin. Finally, a Dx output propagates the Dx input to the CS cell of the same rank in the next lower row. Inverter 244 produces the logical negation of input A, or $A^-$. NAND gate 246 produces the output $[A^-Cin^-]$. NAND gate 248 produces the output $[A^-Dx^-]$, while NAND gate 250 produces the output $[DxCin]^-$. NAND gate 252 then produces the logical output Cout=$[[A^-Cin]^-[A^-Dx]^-[DxCin]^-]^-$, which reduces to Cout=$[A^-Cin]+[A^-Dx]+[DxCin]$.

Continuing with FIG. 14, inverter 254 produces the logical negation of mode control P, $(P^-)$. Inverter 256 produces the logical negation of input Dx, $(Dx^-)$, and inverter 258 produces the logical negation of the carry in input Cin, $(Cin^-)$. NAND gate 260 produces the logical output $[A^-DxCin^-P^-]^-$. NAND gate 262 produces the logical output $[A^-Dx^-CinP^-]^-$. NAND gate 264 produces the logical output $[ADxCin]^-$. NAND gate 266 produces the logical output $[ADx^-Cin^-]^-$. NAND gate 268 produces the logical output $[AP]^-$. From these 5 NAND outputs, NAND gate 270 produces the difference output, which is S=$\{[A^-DxCin^-P^-]^-[A^-Dx^-CinP^-]^-[ADxCin]^-[ADx^-Cin^-]^-[AP]^-\}^-$, which can be reduced to S=$[A^-DxCin^-P^-]+[A^-Dx^-CinP^-]+[ADxCin]+[ADx^-Cin^-]+[AP]$.

In the preferred embodiments described herein, a number of digital processors have been identified, some associated with the host vehicle (total 2), some associated with the ladar subsystem (total 3), and some associated with the individual ladar sensors (total 3). The partitioning and the naming of these various digital processors has been made based on engineering judgment, but other partitioning and naming conventions may be used without changing the scope or intent, or affecting the utility of the invention. The function of those processors associated with the vehicle; the vehicle CPU 80, and the collision processor and airbag control unit 75, may be combined in a single digital processor in some future embodiments. A combined vehicle CPU 80 and collision processor and airbag control unit 75 may also incorporate ladar system controller 72, which is normally associated with the ladar subsystem. The ladar system controller 72 (including scene processor 68 and control processor 74) may in some alternative embodiments be eliminated as a standalone circuit, and those functions normally performed by ladar system controller 72, as described herein would then be assumed by a more powerful vehicle CPU 80. Likewise, the object tracking processor 134 of the individual ladar sensor could be absorbed into the vehicle CPU 80, as could other ladar sensor processors such as the data reduction processor 126 and control processor 94. This would follow a trend toward greater centralization of the computing power in the vehicle. A trend towards decentralization may also take place in reverse, some alternative embodiments having ever more of the processing power pushed down into the ladar sensor subsystem (FIG. 5). In other alternative embodiments, perhaps in a robotic vehicle where only a single ladar sensor might be installed, substantially all of the processing power could be incorporated in the individual ladar sensor itself. The term digital processor may be used generically to describe either digital controllers or digital computers, as many controllers may also perform pure mathematical computations, or perform data reduction, and since many digital computers may also perform control operations. Whether a digital processor is termed a controller or a computer is a descriptive distinction, and not meant to limit the application or function of either device.

Figure 15:
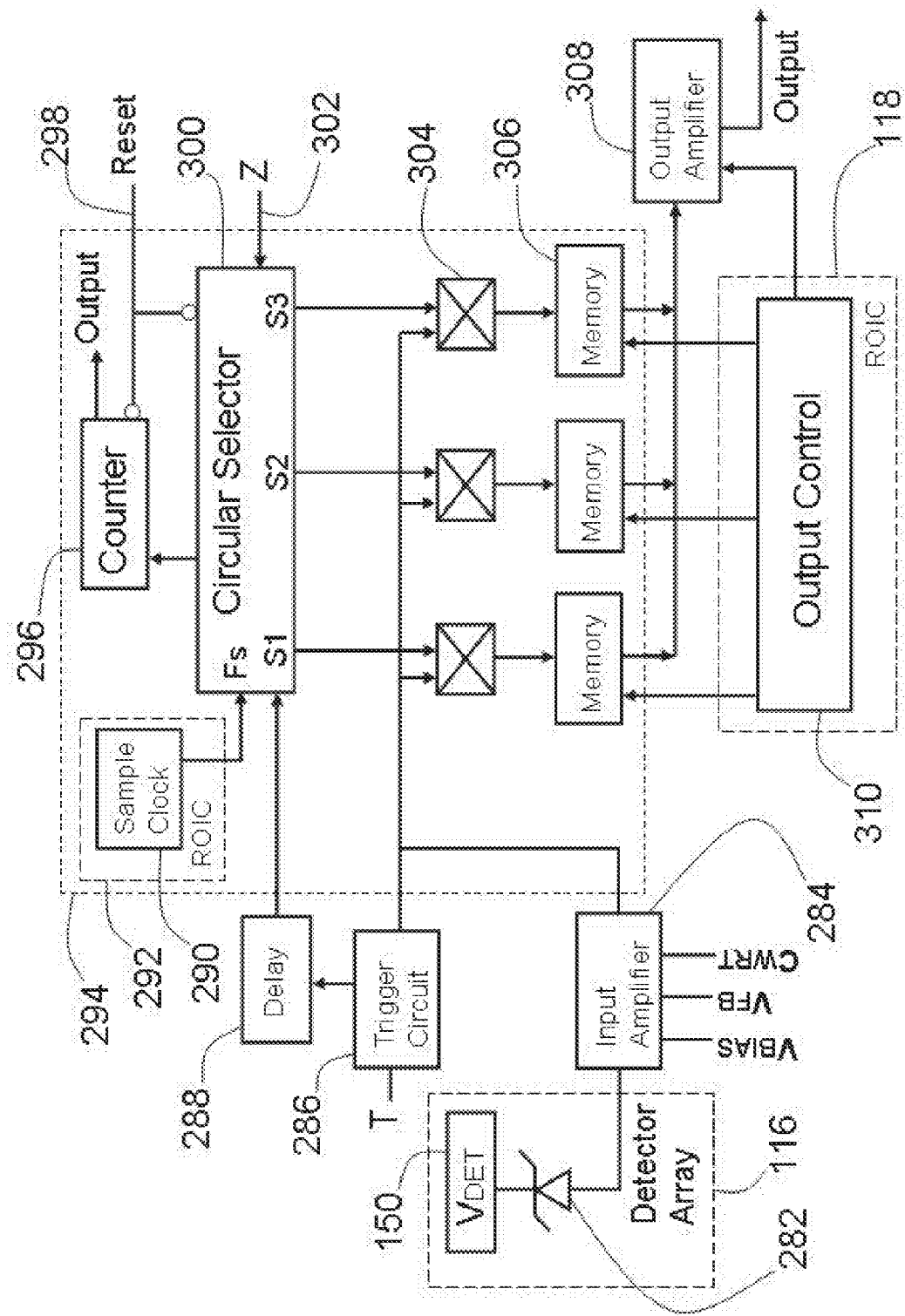
FIG. 15 is a block diagram of a unit cell of the readout integrated circuit (ROIC) of FIG. 8.

The unit cell electronics depicted in FIG. 15 is well adapted to work with a Gaussian single pulse modulation scheme, and works advantageously with other modulation schemes as well, including sequences of flat-topped pulses, Gaussian, or otherwise shaped pulses. These pulses may be of varying width and spacing, in order to reduce range ambiguities, and may also be random pulse sequences, or in other cases, Barker coded pulse sequences. In the typical operation of a short range ladar sensor 52 having a semiconductor laser producing a single Gaussian output pulse, some portion of the pulsed laser light reflected from a surface in the field of view of the short range ladar sensor 52 is concentrated and focused by receive optics 112, passes through receive filter 114, and falls on an individual detector element 282 of detector array 116. The individual element 282 is typically an avalanche photodiode, but may be a PIN or NIP, or other structure. Each individual element 282 of detector array 116 is formed in a semiconducting film comprised of silicon, indium gallium arsenide phosphide, aluminum gallium arsenide, indium gallium nitride, or other semiconducting compound appropriate to the wavelength of operation. Each individual element 282 is biased with a voltage by a bias voltage distribution network VDET 150. The reflected light signal incident upon the individual detector element 282 is converted to an electronic signal, typically a photocurrent, and amplified by input amplifier 284, typically a transimpedance amplifier. The output of input amplifier 284 is distributed to a trigger circuit 286 as well as a number of analog sampling gates 304. The trigger circuit 286 is typically a threshold voltage comparator, set to trigger when a pulse is received which exceeds a predetermined magnitude, though other pulse detection schemes may be used. After a programmable delay through delay circuit 288, the state of circular selector 300 is frozen by the logic transition of trigger circuit 286 output if the unit cell is being operated in TRIGGER mode. Prior to the detection of a received pulse by trigger circuit 286, the sample clock 290 causes the state of circular selector 300 to advance, enabling one of the sampling control outputs S1-S3, which in turn causes a sampling of the input amplifier 284 output by one of the sampling gates 304. The number of transitions of sample clock 290 is counted by counter 296, as the circular selector 300 outputs a logic transition to counter 296 for every cycle of the sampling clock after the release of the active low reset line 298. Circular selector 300 may cycle through outputs S1-S3 in order, or may have a different sequence, depending on the programming. A second circular selector 300, and sample clock 290 may operate in parallel, along with counter 296, analog sampling gates 304 and analog memory cells 306. The combination of sample clock 290, counter 296, circular selector 300, sampling gates 304, and memory cells 306 may be termed a unit cell sampling structure 294, indicated by the short dashed line border. Two, three, or more of these sampling structures may be operated in parallel on the output of input amplifier 284, with the advantages of such a structure to be described later in regards to range ambiguity. Shown in FIG. 15 are three sampling gates, and analog memory cells, but the number may be several hundred or more on some readout ICs 118. Once all of the analog sample data has been taken, a control command from the control processor 94 initiates a readout cycle by activating output control 310 and output amplifier 308 to readout the contents of the analog memory cells 306 in a predetermined order.

In a typical short range ladar sensor 52, and assuming a 1 cm2 VCSEL array with a 5 kW/cm2 power density, and depending upon the reflectivity of the objects in the field of view, and the responsivity and excess noise of the detector array 116, the effective range of a Gaussian single pulse modulation scheme might be in the range of 10-20 meters, using a simple threshold detection technique. Without resorting to a large VCSEL array, which might be expensive and might require a large discharge capacitor to supply a large current pulse, more sophisticated modulation and detection techniques can be used to create additional processing gains, to effectively increase the signal-to-noise ratio, and thus extend the range of the short range ladar sensor 52 without requiring an increase in peak power. In a first modulation scheme, which produces a Gaussian single pulse modulation, a detection technique may be employed which uses the digitized analog samples from each unit cell electrical circuit, and processes these samples in a digital matched filter to find the centroid of the received pulse, resulting in significant processing gain. The processing gains resulting from this structure are proportional to the square root of the number of samples used in the filtering algorithm. For example, a unit cell electrical circuit with 256 analog memory cells 306 could yield a processing gain of 16 if all the available analog samples were used in a matched filter algorithm, assuming Gaussian single pulse modulation, and a normal noise distribution. The term "processing gain" is used here to describe the increase in effective signal-to-noise ratio (SNR) realized by performing the described operations on the voltage samples. Assuming the pulsed laser light is distributed uniformly over just the field of view of the receive optics 112, the effective range of the ladar also increases as the square root of the transmitted power (or SNR), and an increase in range to 40-80 meters could be the result. Single pulse Gaussian modulation may be characteristic of either a solid state laser or a semiconductor laser with a simple driver, and thus may be an attribute of either a long range ladar sensor 46 or a short range ladar sensor 52.

The unit cell electronic circuit of FIG. 15 is well adapted to single pulse modulation, or to more complex modulation scenarios. In a second modulation scheme, a VCSEL array modulated with a series of Barker encoded flat-topped or Gaussian pulses can be sampled by the unit cell electronics of FIG. 15 and analyzed by data reduction processor 126 for range and intensity estimates. In a third modulation scheme, a VCSEL array modulated with a pulsed sinewave allows for greater cumulative energy to be reflected from a feature in a scene in the field of view of either a short range ladar sensor 52 or a long range ladar sensor 46 without an increase in peak power. Each peak of a pulsed sinewave will have a separate reflection from an object or feature in the scene in the field of view of the ladar sensor 52 and the unit cell electrical circuit of FIG. 15 allows the ladar sensor receiver to respond to the cumulative energy from many of these reflected pulses using a minimum of circuitry. The waveform in a preferred embodiment is a number of sinewave cycles, and the number could be quite large, depending on a number of factors. The receiver circuitry of the unit cell electronics shown in FIG. 15 is capable of sampling or of synchronously detecting the cumulative energy of the returned pulse peaks. Two sampling modes may be supported by the unit cell sampling structure shown in FIG. 15. When taking analog samples of single pulse or multi pulse sequences, wherein analog samples of an incoming waveform are being sequentially taken, the sampling impedance control 302 (Z) to the circular selector 300 would be set to a minimum value. The sampling frequency of sample clock 290 would also be selected to produce 10 or perhaps 20, analog samples during each pulse width. When the sampling impedance control 302 is set to a minimum, the sample controls S1, S2, S3 turn on with full voltage during a sampling cycle. Since each sampling gate 304 is a field effect transistor, increasing the sample control voltage S1-S3 will increase the gate-source voltage on the sampling FET, thus lowering the impedance of the channel between source and drain, and setting the sampling gate impedance to a minimum. When the sampling gate 304 impedance is set to a minimum, the storage capacitor serving as analog memory cell 306 charges rapidly to the voltage present at the output of input amplifier 284. This mode can be termed "instantaneous voltage sampling" to distinguish the mode from a second sampling mode, which is selected when the sampling impedance control 302 is set to a higher, or even maximum value. When the sampling impedance control 302 is selected for high impedance, or maximum series resistance value, the outputs S1-S3 would be at or near minimum voltages when enabled, resulting in a lower gate-source voltage across each of the sampling gate FETs 304, and thus a higher sampling gate series resistance in the channel between source and drain of each sampling gate 304 FET. With the series resistance of the sampling gates 304 set to high or maximum value, the effect is to cause an R-C filter to develop, with the analog memory cell 306 storage capacitor performing as an integrating capacitor. This second sampling mode may be very useful when a sinusoidal modulation is applied to the pulsed laser transmitter 106 in the case where the laser is a semiconductor laser, typically a high efficiency VCSEL. By applying a sampling clock to the sampling gate 304 driven by S1, and which is the same frequency as the sinusoidal modulation, a sum frequency and a difference frequency will be in the sampled signal, and the analog memory cell 306 storage capacitor will filter out the sum frequency, and the difference frequency will be zero, leaving only a DC voltage component, which will be a trigonometric function of the phase difference. Over a number of cycles of the sinusoidal modulation from the output of input amplifier 284, this DC voltage will emerge as the sine or cosine of the phase difference between the transmitted and received waveforms. This phase difference is proportional to the range to a reflecting surface. To improve the processing gain, the second sampling gate driven by the S2 signal is driven by the same sampling clock frequency, but shifted by 90 degrees in phase, and the greater of the two DC voltages, or a ratio of the two voltages, may be used to estimate phase, and thereby range. Typically, a ratio is preferred, as it removes the variation in amplitude of the incoming sinewave as an error term. This type of detection relies on "In-phase" and "Quadrature-phase" local references, and is often referred to as an "I&Q" detection scheme. Thus, the sampling gates 304 can be operated as instantaneous voltage samplers in a first sampling mode, or as frequency mixers in a second sampling mode, depending on the state of the sampling impedance control 302, and the frequency applied by sampling clock 290. In the first sampling mode, the shape of a pulse or sequence of pulses may be acquired, and in second sampling mode, a periodic waveform modulation such as a sinewave, may be demodulated through the frequency mixing effect and integration on a storage capacitor, resulting in a phase measurement and thereby range. In a third modulation case, two and perhaps three sinewaves of different frequencies are superimposed as a modulation signal on a semiconductor laser, and the received waveform output from input amplifier 284 is sampled by 2 or 3 unit cell sampling structures 294 arranged in parallel, and operating at the 2 or 3 different frequencies of the modulation signal. Each frequency is demodulated and the phase measured by the unit cell sampling structure tuned to the frequency of interest by feeding the appropriate sampling frequency from sample clock 290, typically a copy of the modulation frequency. Demodulation within the unit cell electrical circuit reduces the data at an early point, reducing the requirements for memory and fast digital processors. Alternatively, the demodulation of a sinewave or other periodic waveform may be performed in data reduction processor 126 on the digitized representations of the analog samples, given a fast arithmetic unit, and the proper algorithm. This illustrates the power and flexibility of the instantaneous voltage sampling mode, as the data reduction processor 126 can be adapted to run PWD, CSC, FIR filter, IIR filter, I&Q, or any number of curve fitting algorithms to increase SNR, measure phase, or otherwise reduce range measurement errors.

When measuring the phase of reflected laser energy with respect to a transmitted laser sinewave modulation, certain limits must be observed. If the ladar should have a maximum range capability of 150 meters in free space, the total round trip delay from transmit to receive would be around 1 microsecond. For the phase measurement to be meaningful, the frequency of transmission must therefore be less than 1 MHz to avoid spatial (distance) aliasing of targets at the 150 meter limit. In other words, the further the target, the lower the frequency of modulation must be for a single modulation frequency phase measurement to be meaningful. In a conventional sweep radar, the dwell time on the target is limited, so return signals beyond the maximum design range often do not appear as aliased, or "ghost" signals at a shorter apparent range. In the ladar of the instant invention, the typical mode is a staring mode, and there is no sweep of the illuminating beam or receiving antenna across the target space. Therefore, in the ladar sensor 52 of the present design, responses from targets beyond the designed maximum range could produce an aliased response (one in which the phase shift is greater than $2\pi$). A method for resolving these aliased, or "ghost" images is to illuminate the target in a second or third transmission with a slightly different frequency; for example 0.95 MHz versus the 1.0 MHz in a first gated sinewave illuminating pulse. If the target image remains at the same apparent range, it is likely a real target at a range less than the design maximum range limit. If the apparent range of the target shifts at the second illuminating frequency, it is likely the image is an aliased, or "ghost" image from a target at a distance beyond the design maximum range of the ladar sensor 52. The ladar sensor 52 of the instant invention makes use of a frequency agile transmitter which can rapidly tune from a first transmission frequency to a second transmission frequency, and more if necessary. In a preferred embodiment, the unit cell sampling structure 294 is doubled or tripled, and operated in parallel, and two or three sinewave modulation signals are superimposed on the semiconductor laser transmitter. When using multiple frequency modulation, the individual frequencies should not be simple harmonics of each other; i.e., they should not be related by fractions of low value integers. The ladar sensor 52 in a preferred embodiment makes use of a semiconductor VCSEL laser, enabling the use of shaped single pulses, shaped multiple pulses, shaped and encoded multiple pulses, gated sinewave, gated chirped sinewave, and multi-frequency gated sinewave modulation schemes. In alternative embodiments, a low power semiconductor laser may be electronically modulated, and the resulting modulated optical output amplified by an optical amplifier. By selecting a modulation regime appropriate to the particular scene or objects to be imaged, the flexible modulation capabilities of the present design result in a minimum sized pulsed laser illuminating source with maximum performance in range and resolution.

Figure 16:
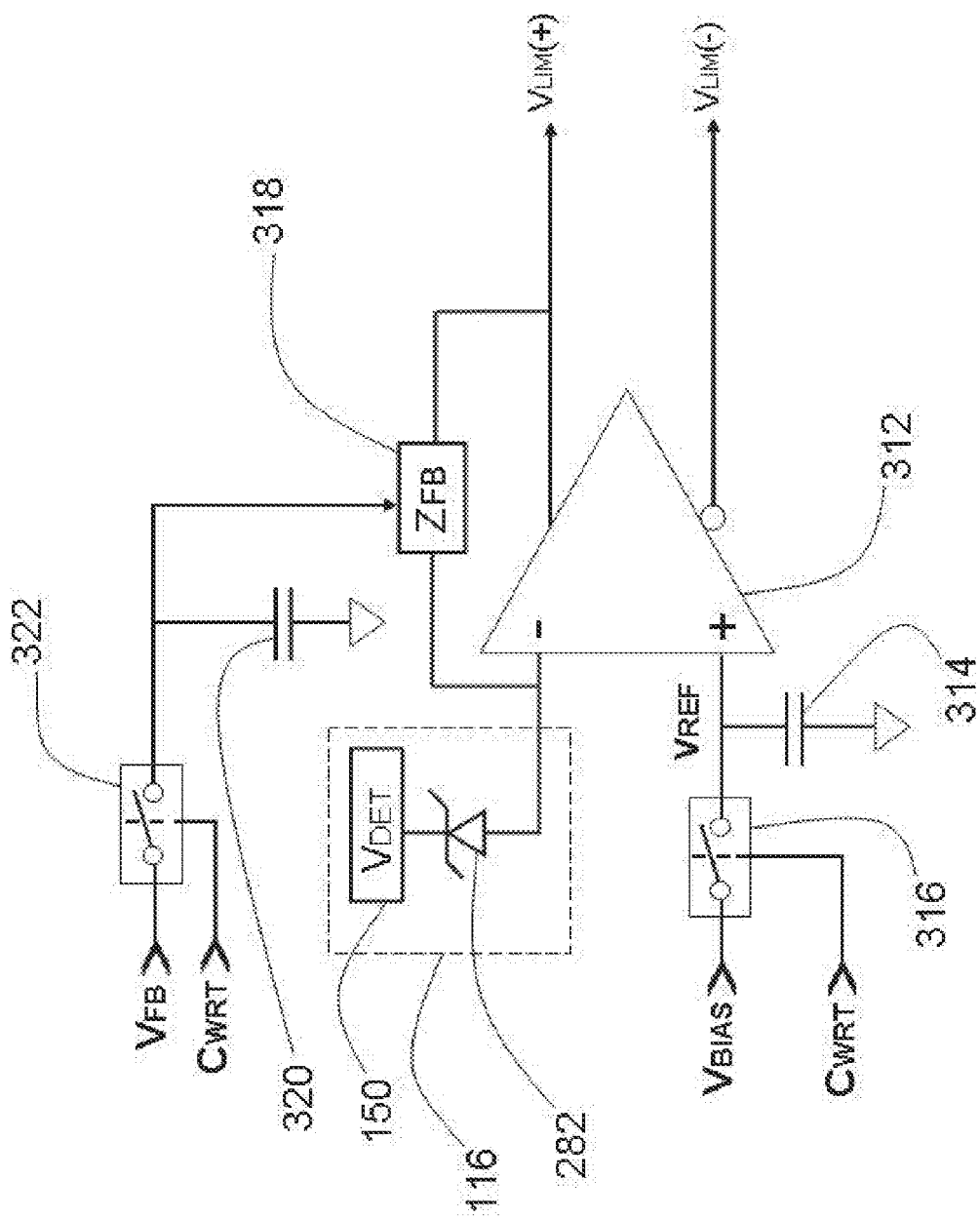
FIG. 16 is a schematic diagram of the input amplifier block of FIG. 15.

FIG. 16 shows the structure of input amplifier 284 of the unit cell electrical circuit. A difference amplifier 312 has a programmable voltage reference (VREF) connected to a non-inverting (+) input. The inverting (−) input of difference amplifier 312 is connected to the anode of an individual detector element 282 of detector array 116. The cathode of individual detector element 282 is connected to a programmable detector bias voltage generator 150 (VDET). The inverting (−) input of difference amplifier 312 also connects to a feedback circuit 318 which may be a resistor, or may be a transistor configured as a variable resistance, or may also contain frequency selective elements such as capacitors connected in parallel, and/or small inductors connected in series. The second terminal of the feedback circuit connects to the non-inverting output of difference amplifier 312. This configuration is often termed a transimpedance amplifier when the feedback circuit 318 is a resistor, and is well suited to APD or PIN diode inputs, which resemble current sources in some respects. Use of a difference amplifier in this case provides reasonable low noise response at low input signal levels, while at the same time compressing gracefully when subjected to high level input signals. The non-inverting (+) input of difference amplifier 312 is connected to a storage capacitor 314 which has a reference voltage stored thereon. The reference voltage on capacitor 314 is useful in negating the effects of the reverse leakage current from individual detector element 282. This reverse leakage current develops an offset voltage across ZFB which is presented at the inverting (−) input of difference amplifier 312. A switch 316 is connected to the capacitor 314 and to the VBIAS input which is provided by the ROIC 118. The switch 316 is closed briefly by a logic "1" pulse on the CWRT input, in between frame acquisition times, allowing the capacitor 314 to charge up, and then the switch 316 is opened. By customizing an input offset voltage for each individual detector element 282 and amplifier 312, a maximum dynamic range for the amplifier 312 output may be preserved. Similarly, the control input of feedback circuit 318 is connected to a storage capacitor 320 which has a control voltage stored thereon. The control voltage on capacitor 320 is useful in adjusting the value of the feedback resistance, which is typically the channel of a field effect transistor. This control voltage is applied to the gate of the FET, and modulates the width of the channel, and thus the resistance. Alternatively, the control voltage may be used to change the value of a capacitance (e.g., a varactor diode) in the feedback impedance, ZFB. A switch 322 is connected to the capacitor 320 and to the VFB input which is provided by the ROIC 118. The switch 322 is closed briefly by a logic "1" pulse on the CWRT input, in between frame acquisition times, allowing the capacitor 320 to charge up, and then the switch 322 is opened. By customizing a feedback impedance for each individual detector element 282 and amplifier 312, a maximum dynamic range for the amplifier 312 output may be preserved. A second difference amplifier with a fixed gain may be cascaded to provide additional dynamic range. Typical values for transimpedance gain are in the range of 50-250 kohms, depending on the pulse widths chosen for the illuminating pulses, and may be programmable in some embodiments. Typical values of voltage gain for a second difference amplifier are in the range of 10-50, and again may be programmable in some embodiments. A third differential stage may be used to extend dynamic range even further in alternative embodiments, and the number of cascaded stages may be extended indefinitely with some limitations imposed by the nature of integrated circuits. One major limitation is the difficulty of isolating input from output, preventing regeneration. A second limitation on gain, again imposed by the limited isolation achievable in an integrated circuit process, occurs between neighboring unit cell electrical circuits. Unit cell gain must therefore be limited to avoid low level parasitic coupling from a brightly illuminated adjacent unit cell, which could interfere with the low level input signal from individual detector element 282.

FIG. 17 is a diagram showing the mating of detector array 116 with readout IC 118. Row amplifiers 328 and column amplifiers 334 allow the output from a unit cell electrical circuit 332 to be output as part of a row output or column output read cycle. All signals to and from readout IC 118 are communicated through bond pads 326 at the periphery of the ROIC 118. FIG. 17 shows details of the placement of the indium bump 330 atop each unit cell electrical circuit 332 which is then compressed and deformed under temperature and pressure as part of the bonding process which mates detector array 116 to readout IC 118. The indium bump 330 may instead be a low temperature solder bump, which may be reflowed to permanently bond detector array 116 to readout IC 118. The arrow shows the direction of mating, and the top of detector array 116 shows the grid pattern of an optional microlens array comprised of lens elements 324 which collect and focus light into each of the individual detector elements of detector array 116 formed on the anterior surface.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:
1. A ladar system comprising:
a first ladar sensor and a second ladar sensor;
said first ladar sensor having
a laser transmitter with a pulsed laser light output transmitting light at a first wavelength through a diffusing optic for illuminating a scene in a field of view of said first ladar sensor,
a time zero reference circuit having a time zero reference output, said time zero reference output adapted to signal the beginning of the pulsed laser light transmission,
receiving optics for collecting and conditioning the pulsed laser light reflected from said scene in the field of view,
a receive filter which receives light at said first wavelength and transmits light at said first wavelength and blocks light at a second wavelength,
a two dimensional array of light sensitive detectors positioned at a focal plane of said receiving optics, and receiving light filtered through said receive filter at said first wavelength, and each of said light sensitive detectors with an output producing an electrical response signal from a reflected portion of said pulsed laser light output,
a detector bias circuit connected to a voltage distribution grid of said array of light sensitive detectors,
a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical response signal amplifier, a range measuring circuit connected to the output of each of said electrical response signal amplifiers, said range measuring circuit further connected to the time zero reference output, and adapted to produce a range measurement for each light sensitive detector based on the number of clock cycles occurring between the time zero reference output and the time of arrival of the electrical response signal, said second ladar sensor having a laser transmitter with a pulsed laser light output transmitting light at a second wavelength through a diffusing optic for illuminating a scene in a field of view of said second ladar sensor, a time zero reference circuit having a time zero reference output, said time zero reference output adapted to signal the beginning of the pulsed laser light transmission, receiving optics for collecting and conditioning the pulsed laser light reflected from said scene in the field of view, a receive filter which receives light at said second wavelength and transmits light at said second wavelength and blocks light at said first wavelength, a two dimensional array of light sensitive detectors positioned at a focal plane of said receiving optics, and receiving light filtered through said receive filter at said second wavelength, and each of said light sensitive detectors with an output producing an electrical response signal from a reflected portion of said pulsed laser light output, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical response signal amplifier, a range measuring circuit connected to the output of each of said electrical response signal amplifiers, said range measuring circuit further connected to the time zero reference output, and adapted to produce a range measurement for each light sensitive detector based on the number of clock cycles occurring between the time zero reference output and the time of arrival of the electrical response signal.

2. The ladar system of claim 1 wherein said first ladar sensor is mounted to a vehicle.

3. The ladar system of claim 1 wherein said first ladar sensor has a voltage sampling circuit connected to the output of each of said electrical response signal amplifiers.

4. The ladar system of claim 3 wherein said first ladar sensor has an analog to digital converter connected to each of said voltage sampling circuits, and said analog to digital converter is adapted to produce a set of digitized analog samples.

5. The ladar system of claim 4 wherein said first ladar sensor has a digital processor connected to an output of said analog to digital converter, said digital processor adapted to execute signal processing operations on said digitized analog samples.

6. The ladar system of claim 5 wherein said digital processor has a floating point hardware divide circuit.

7. The ladar system of claim 5 wherein said digital processor executes an algorithm on the digitized analog samples selected from the set of; a Fourier transform, convolution, integration, differentiation, pulse width discrimination, code sequence correlation, finite impulse response filtering, infinite impulse response filtering, phase measurement, and curve fitting using the least squares method.

8. The ladar system of claim 1 wherein said laser transmitter of the first ladar sensor comprises an electrically pumped semiconductor laser formed in a semiconducting gain medium with at least one element selected from the set of indium, gallium, arsenic, phosphorus.

9. The ladar system of claim 1 wherein the laser transmitter of the first ladar sensor comprises an optically pumped solid state laser formed in a gain medium selected from the set of yttrium aluminum garnet, erbium doped glass, neodymium doped yttrium aluminum garnet, and erbium doped yttrium aluminum garnet.

10. The ladar system of claim 1 wherein said first ladar sensor has the two dimensional array of light sensitive detectors mounted directly to the readout integrated circuit.

11. The ladar system of claim 2 wherein said first ladar sensor is integrated into an assembly selected from the set of; a turn signal, taillight, parking light, mirror assembly, and brake light.

12. The ladar system of claim 2 wherein said vehicle further has at least one two dimensional imaging camera sighted to have a field of view overlapping the field of view of the first ladar sensor, and said vehicle further having a digital processor adapted to merge the data from said first ladar sensor with data from said two dimensional imaging camera.

13. The ladar system of claim 8 wherein said laser transmitter is an array of semiconductor lasers modulated by a current controlled by at least one transistor.

14. The ladar system of claim 2 wherein said vehicle also has a duplex radio link and radio antenna adapted to receive radio transmissions.

15. The ladar system of claim 1 wherein said electrical response signal amplifiers each have a storage capacitor and programming circuitry adapted to provide a programmable reference voltage to an amplifier input.

16. The ladar system of claim 1 wherein said electrical response signal amplifiers each have a storage capacitor and programming circuitry adapted to provide a programmable feedback control voltage to an amplifier feedback circuit.

17. A ladar system comprising:

a first ladar sensor and a second ladar sensor:

said first ladar sensor having a semiconductor laser transmitter with a pulsed laser light output transmitting light with a first pulse width through a diffusing optic for illuminating a scene in a field of view of said first ladar sensor, a time zero reference circuit having a time zero reference output, said time zero reference output adapted to signal the beginning of the pulsed laser light transmission, receiving optics for collecting and conditioning the pulsed laser light reflected from said scene in the field of view, a two dimensional array of light sensitive detectors positioned at a focal plane of said receiving optics, and each of said light sensitive detectors with an output producing an electrical pulse from a reflected portion of said pulsed laser light output, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical pulse amplifier adapted to amplify the electrical pulses, a pulse width discriminator adapted to receive electrical pulses from each unit cell, and to pass through valid electrical pulses of said first pulse width, and to block pulses of other pulse widths, a range measuring circuit adapted to measure range for each unit cell based on the number of clock cycles between the time zero reference pulse, and the time of arrival of said valid electrical pulses, said second ladar sensor having a semiconductor laser transmitter with a pulsed laser light output transmitting light with a second pulse width through a diffusing optic for illuminating a scene in a field of view of said second ladar sensor, a time zero reference circuit having a time zero reference output, said time zero reference output adapted to signal the beginning of the pulsed laser light transmission, receiving optics for collecting and conditioning the pulsed laser light reflected from said scene in the field of view, a two dimensional array of light sensitive detectors positioned at a focal plane of said receiving optics, and each of said light sensitive detectors with an output producing an electrical pulse from a reflected portion of said pulsed laser light output, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical pulse amplifier adapted to amplify the electrical pulses, a pulse width discriminator adapted to receive electrical pulses from each unit cell, and to pass through valid electrical pulses of said second pulse width, and to block pulses of other pulse widths, a range measuring circuit adapted to measure range for each unit cell based on the number of clock cycles between the time zero reference pulse, and the time of arrival of said valid electrical pulses.

18. The ladar system of claim 17 wherein said first ladar sensor is mounted to a vehicle.

19. The ladar system of claim 17 wherein said first ladar sensor has a voltage sampling circuit connected to the output of each of said electrical response signal amplifiers.

20. The ladar system of claim 19 wherein said first ladar sensor has an analog to digital converter connected to each of said voltage sampling circuits, and said analog to digital converter adapted to produce a set of digitized analog samples.

21. The ladar system of claim 20 wherein said first ladar sensor has a digital processor connected to an output of said analog to digital converter, said digital processor adapted to execute signal processing operations on said digitized analog samples.

22. The ladar system of claim 21 wherein said digital processor has a floating point hardware divide circuit.

23. The ladar system of claim 21 wherein said digital processor executes an algorithm on the digitized analog samples selected from the set of; a Fourier transform, convolution, integration, differentiation, pulse width discrimination, code sequence correlation, finite impulse response filtering, infinite impulse response filtering, phase measurement, and curve fitting using the least squares method.

24. The ladar system of claim 17 wherein said first ladar sensor has a laser transmitter comprising an electrically pumped semiconductor laser formed in a semiconducting gain medium with at least one element selected from the set of indium, gallium, arsenic, phosphorus.

25. The ladar system of claim 17 wherein said first ladar sensor has the two dimensional array of light sensitive detectors mounted directly to the readout integrated circuit.

26. The ladar system of claim 18 wherein said first ladar sensor is integrated into an assembly selected from the set of; a turn signal, taillight, parking light, mirror assembly, and brake light.

27. The ladar system of claim 18 wherein said vehicle further has at least one two dimensional imaging camera sighted to have a field of view overlapping the field of view of the first ladar sensor, and said vehicle further having a digital processor adapted to merge the data from said first ladar sensor with data from said two dimensional imaging camera.

28. The ladar system of claim 17 wherein said laser transmitter is an array of semiconductor lasers modulated by a current controlled by at least one transistor.

29. The ladar system of claim 18 wherein said vehicle also has a duplex radio link and radio antenna adapted to receive radio transmissions.

30. A ladar system comprising:

a first ladar sensor and a second ladar sensor:

said first ladar sensor having a semiconductor laser transmitter with a laser light output transmitting a first coded sequence of light pulses through a diffusing optic for illuminating a scene in a field of view of said first ladar sensor, a time zero reference circuit having a time zero reference output, said time zero reference output adapted to signal the beginning of the transmission of the first coded sequence of light pulses, receiving optics for collecting and conditioning the coded sequence of light pulses reflected from said scene in the field of view, a two dimensional array of light sensitive detectors positioned at a focal plane of said receiving optics, and each of said light sensitive detectors converting the reflected portion of said first coded sequence of light pulses into a first coded sequence of electrical pulses, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical pulse amplifier adapted to amplify the first coded sequence of electrical pulses, a code sequence correlator adapted to receive electrical signals from each unit cell, and to detect and validate said first coded sequence of electrical pulses, and to reject other electrical signals, a range measuring circuit adapted to measure a range for each unit cell, based on the number of clock cycles between the time zero reference pulse, and the time of arrival of said first coded sequence of electrical pulses, said second ladar sensor having a semiconductor laser transmitter with a laser light output transmitting a second coded sequence of light pulses through a diffusing optic for illuminating a scene in a field of view of said second ladar sensor, a time zero reference circuit having a time zero reference output, said time zero reference output adapted to signal the beginning of the transmission of the second coded sequence of light pulses, receiving optics for collecting and conditioning the coded sequence of light pulses reflected from said scene in the field of view, a two dimensional array of light sensitive detectors positioned at a focal plane of said receiving optics, and each of said light sensitive detectors converting the reflected portion of said second coded sequence of light pulses into a second coded sequence of electrical pulses, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical pulse amplifier adapted to amplify the second coded sequence of electrical pulses, a code sequence correlator adapted to receive electrical signals from each unit cell, and to detect and validate said second coded sequence of electrical pulses, and to reject other electrical signals, a range measuring circuit adapted to measure a range for each unit cell, based on the number of clock cycles between the time zero reference pulse, and the time of arrival of said second coded sequence of electrical pulses.

31. The ladar system of claim 30 wherein said first ladar sensor is mounted to a vehicle.

32. The ladar system of claim 31 wherein said first coded sequence of light pulses indicates vehicle specific information.

33. The ladar system of claim 30 wherein said first ladar sensor has a voltage sampling circuit connected to the output of each of said electrical pulse amplifiers.

34. The ladar system of claim 33 wherein said first ladar sensor has an analog to digital converter connected to each of said voltage sampling circuits, and said analog to digital converter adapted to produce a set of digitized analog samples.

35. The ladar system of claim 34 wherein said first ladar sensor has a digital processor connected to an output of said analog to digital converter, said digital processor adapted to execute signal processing operations on said digitized analog samples.

36. The ladar system of claim 30 wherein said first ladar sensor has a laser transmitter comprising an electrically pumped semiconductor laser formed in a semiconducting gain medium with at least one element selected from the set of indium, gallium, arsenic, phosphorus.

37. The ladar system of claim 31 wherein said first ladar sensor is integrated into an assembly selected from the set of; a turn signal, taillight, parking light, mirror assembly, and brake light.

38. The ladar system of claim 31 wherein said vehicle further has at least one two dimensional imaging camera sighted to have a field of view overlapping the field of view of the first ladar sensor, and said vehicle further having a digital processor adapted to merge the data from said first ladar sensor with data from said two dimensional imaging camera.

39. The ladar system of claim 31 wherein said vehicle also has a duplex radio link and radio antenna adapted to receive radio transmissions.

40. A ladar sensor comprising:

a semiconductor laser transmitter with a laser light output transmitting a modulated burst of light through a diffusing optic for illuminating a scene in a field of view of said ladar sensor, a time zero reference circuit having a time zero reference output, said time zero reference output adapted to signal the beginning of the transmission of said modulated burst of light, receiving optics for collecting and conditioning the modulated burst of light reflected from said scene in the field of view, a two dimensional array of light sensitive detectors positioned at a focal plane of said receiving optics, and each of said light sensitive detectors converting the reflected portion of said modulated burst of light into a modulated electrical burst, a detector bias circuit connected to a voltage distribution grid of said array of light sensitive detectors, a readout integrated circuit with a clock circuit and a plurality of unit cell electrical circuits, each of said unit cell electrical circuits having an input connected to said clock circuit and another input connected to one of said light sensitive detector outputs, each unit cell electrical circuit having an electrical amplifier adapted to amplify the modulated electrical burst, voltage sampling circuit connected to the output of each of said electrical amplifiers, and adapted to produce a set of analog samples of said modulated electrical burst, an analog to digital converter connected to each of said voltage sampling circuits, and said analog to digital converter adapted to produce a set of digitized analog samples for each unit cell a digital processor with a hardware implemented floating point divide unit adapted to execute a mathematical algorithm on said digitized analog samples for each unit cell, and to thereby demodulate said modulated electrical burst from each unit cell, and said digital processor also adapted to measure a range for each unit cell, based on the number of clock cycles between the time zero reference output, and the time of arrival of said modulated electrical burst.

* * * * *